US010715721B2

(12) United States Patent
Takamoto

(10) Patent No.: US 10,715,721 B2
(45) Date of Patent: Jul. 14, 2020

(54) CONTROL DEVICE, CONTROL METHOD, AND PROGRAM

(71) Applicant: Sony Corporation, Tokyo (JP)

(72) Inventor: Masaru Takamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/099,533

(22) PCT Filed: Feb. 9, 2017

(86) PCT No.: PCT/JP2017/004826
§ 371 (c)(1),
(2) Date: Nov. 7, 2018

(87) PCT Pub. No.: WO2017/199487
PCT Pub. Date: Nov. 23, 2017

(65) Prior Publication Data
US 2019/0166304 A1 May 30, 2019

(30) Foreign Application Priority Data
May 18, 2016 (JP) .................................. 2016-099733

(51) Int. Cl.
H04N 5/232 (2006.01)
H04N 7/18 (2006.01)
G03B 15/00 (2006.01)
H04N 5/247 (2006.01)

(52) U.S. Cl.
CPC ......... *H04N 5/23218* (2018.08); *G03B 15/00* (2013.01); *H04N 5/232* (2013.01); *H04N 5/23245* (2013.01); *H04N 5/247* (2013.01); *H04N 7/18* (2013.01); *H04N 7/183* (2013.01)

(58) Field of Classification Search
CPC .................................................. H04N 5/23218
USPC ....................................................... 348/222.1
See application file for complete search history.

(56) References Cited

FOREIGN PATENT DOCUMENTS

| JP | 2005-64586 A | 3/2005 |
|----|--------------|--------|
| JP | 2007-324966 A | 12/2007 |
| JP | 2012-211796 A | 11/2012 |
| JP | 2014-182026 A | 9/2014 |

OTHER PUBLICATIONS

International Search Report and Written Opinion and English translations thereof dated Apr. 25, 2017 in connection with International Application No. PCT/JP2017/004826.
International Preliminary Report on Patentability and English translation dated Nov. 29, 2018 in connection with International Application No. PCT/JP2017/004826.

*Primary Examiner* — Joel W Fosselman
(74) *Attorney, Agent, or Firm* — Wolf, Greenfield & Sacks, P.C.

(57) ABSTRACT

Provided is a control device including: an imaging control section that controls imaging in an imaging device; and a detecting section that detects a photographic subject on a basis of a first captured image in which a detection region set at a part within a field angle of the imaging device has been imaged. The imaging control section makes the imaging device perform imaging of the detection region or imaging of an acquisition region set within the field angle of the imaging device, and in a case where the photographic subject has been detected on a basis of the first captured image, the imaging control section makes the imaging device perform imaging of the acquisition region.

19 Claims, 9 Drawing Sheets

CONTROL DEVICE, CONTROL METHOD, AND PROGRAM

CROSS-REFERENCE TO RELATED APPLICATIONS

This application is a U.S. National Stage entry under 35 U.S.C. § 371 of International Application No. PCT/JP2017/004826, filed in the Japan Patent Office on Feb. 9, 2017, which claims priority to Japanese Patent Application No. 2016-099733, filed in the Japan Patent Office on May 18, 2016, each of which is incorporated by reference herein in its entirety.

TECHNICAL FIELD

The present disclosure relates to a control device, a control method, and a program.

BACKGROUND ART

A technology to image images for different uses with one imaging device has been developed. As a technology that images "a vehicle detection image being a low resolution image in which at least any of rows and columns have been thinned out" and "a car number recognition image being a high resolution image in which none has been thinned out" by switching them by one CMOS (Complementary Metal Oxide Semiconductor) cameral, for example, a technology described in the following Patent Literature 1 is cited.

CITATION LIST

Patent Literature

Patent Literature 1: JP 2004-94412A

DISCLOSURE OF INVENTION

Technical Problem

For example, there exists widely a system that utilizes an imaging device used by being installed at a fixed point, such as an industrial camera used in a factory, a physical distribution system, etc., a camera used in an ITS (Intelligent Transport Systems), and a security camera. In the system as described in the above, for example, on the basis of a captured image (moving image or still image) having been imaged by an imaging device, a photographic subject (for example, an object flowing through a line, a movable object such as a car, human being, etc.) is detected, and the detection result is used for various uses corresponding to the system.

In the system as described in the above, it is desired to obtain a captured image including a photographic subject and, in addition, to reduce an amount of data of image data showing the captured image.

Here, for example, in the case where the technology described in Patent Literature 1 is used, a photographic subject is detected by imaging a low resolution image in which at least any of rows and columns have been thinned out. Then, in the case where the photographic subject has been detected, a high resolution image will be imaged. Therefore, for example, in the case where the technology described in Patent Literature 1 is used, an amount of data of image data showing the captured image can be reduced than a case where high resolution images are always imaged.

However, for example, as in the technology described in Patent Literature 1, in the case of imaging a low resolution image in which at least any of rows and columns have been thinned out, since the whole field angle of an imaging device is imaged, it is not always possible to sufficiently reduce an amount of data of image data showing a captured image.

In the present disclosure, a novel and improved control device, control method, and program that can obtain a captured image including a photographic subject while reducing an amount of data, are proposed.

Solution to Problem

According to the present disclosure, there is provided a control device including: an imaging control section that controls imaging in an imaging device; and a detecting section that detects a photographic subject on a basis of a first captured image in which a detection region set at a part within a field angle of the imaging device has been imaged. The imaging control section makes the imaging device perform imaging of the detection region or imaging of an acquisition region set within the field angle of the imaging device. In a case where the photographic subject has been detected on a basis of the first captured image, the imaging control section makes the imaging device perform imaging of the acquisition region.

In addition, according to the present disclosure, there is provided a control method that is executed by a control device, the control method including: a step of controlling imaging in an imaging device; and a step of detecting a photographic subject on a basis of a first captured image in which a detection region set at a part within a field angle of the imaging device has been imaged. In the controlling step, the imaging device is caused to perform imaging of the detection region or imaging of an acquisition region set within the field angle of the imaging device, and, in a case where the photographic subject has been detected on a basis of the first captured image, the imaging device is caused to perform imaging of the acquisition region.

In addition, according to the present disclosure, there is provided a program for causing a computer to achieve: a function of controlling imaging in an imaging device; and a function of detecting a photographic subject on a basis of a first captured image in which a detection region set at a part within a field angle of the imaging device has been imaged. The function of controlling imaging makes the imaging device perform imaging of the detection region or imaging of an acquisition region set within the field angle of the imaging device, and, in a case where the photographic subject has been detected on a basis of the first captured image, the function of controlling imaging makes the imaging device perform imaging of the acquisition region.

Advantageous Effects of Invention

According to the present disclosure, it is possible to obtain a captured image including a photographic subject while reducing an amount of data.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
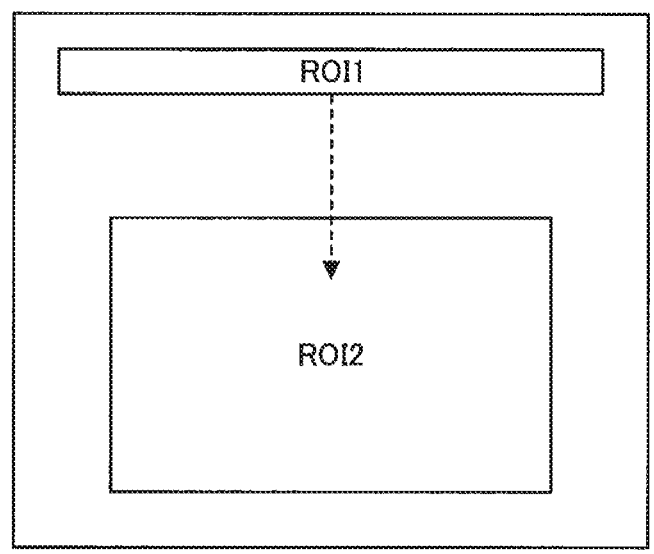
FIG. 1 is an explanatory illustration showing the first setting example of a detection region according to the present embodiment and an acquisition region according to the present embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Moreover, in the below, description is given in the order shown in the following description.
1. Control method according to present embodiment
2. Control device according to present embodiment
3. Program according to present embodiment
(Control Method According to Present Embodiment)

First, a control method according to the present embodiment is described. Hereinafter, a case where a control device according to the present embodiment performs processes related to the control method according to the present embodiment, is taken as an example.

[1] Outline of Control Method According to Present Embodiment

As mentioned in the above, in a system using an imaging device, it is desired to obtain a captured image including a photographic subject and, in addition, to reduce an amount of data of image data showing the captured image.

Then, the control device according to the present embodiment controls imaging in an imaging device so as to make the imaging device perform imaging (imaging of a later-mentioned detection region) for detecting a photographic subject, or imaging (imaging of a later-mentioned acquisition region) for obtaining a captured image including a photographic subject.

The control device according to the present embodiment, for example, makes the imaging device perform imaging for detecting a photographic subject, and detects the photographic subject on the basis of a captured image (the first captured image) obtained by the imaging for detecting the photographic subject. Then, in the case where the photographic subject has been detected on the basis of the captured image obtained by the imaging for detecting the photographic subject, the control device according to the present embodiment makes it perform the imaging for obtaining a captured image including the photographic subject.

The control device according to the present embodiment makes it perform imaging, for example, for each frame.

For example, the control device according to the present embodiment makes it perform the imaging for detecting a photographic subject at a set predetermined frame rate.

Moreover, in the case where a photographic subject has been detected in one frame in which imaging for detecting a photographic subject has been performed, the control device according to the present embodiment makes it perform imaging for obtaining a captured image including a photographic subject in the next frame.

Here, in the case of switching from imaging for detecting a photographic subject to imaging for obtaining a captured image including the photographic subject, after a predetermined imaging delay time has elapsed, the control device according to the present embodiment makes it perform the imaging for obtaining the captured image including the photographic subject. As the predetermined imaging delay time according to the present embodiment, an imaging delay time having been set beforehand or an imaging delay time on the basis of the movement speed of a photographic subject is cited. That is, the control device according to the present embodiment makes it perform the imaging for obtaining the captured image including the photographic subject at a predetermined timing corresponding to an imaging delay time having been set beforehand, or a timing on the basis of the movement speed of the photographic subject.

As the imaging device according to the present embodiment, for example, an imaging device including a CMOS as an image sensor is cited. The image sensor included in the imaging device according to the present embodiment may include only the CMOS, or may be a stacked type image sensor in which other components, such as a CCD (Charge Coupled Device), are stacked on the CMOS.

In this connection, the imaging device according to the present embodiment is not limited to the example shown in the above. For example, as the imaging device according to the present embodiment, an imaging device including an arbitrary image sensor to which a global shutter can be applied, is cited.

As the imaging for detecting a photographic subject according to the present embodiment, imaging of a detection region set at a part in the field angle of an imaging device is cited. The detection region according to the present embodiment corresponds to a sensing region for detecting a photographic subject.

As mentioned later, the control device according to the present embodiment detects a photographic subject on the basis of a captured image (the first captured image) in which a detection region has been imaged. That is, the detection region according to the present embodiment may be a region that makes it possible to detect a photographic subject on the basis of a captured image in which the detection region has been imaged, and that has a minimum size in a part within the field angle of an imaging device. As the detection region according to the present embodiment, a part of a region within a field angle that makes it possible to image at least a part of a photographic subject is cited. In this connection, the source of a photographic subject in the control device according to the present embodiment is mentioned later.

In the case of citing a concrete example, as the detection region according to the present embodiment, for example, a region of one row to about several rows or one row to about ten and several rows within the field angle of an imaging device is cited. That is, even if comparing with a captured image in which, simply, at least any of rows and columns have been thinned out, an amount of data of image data of a captured image (the first captured image) in which the detection region has been imaged becomes small enough.

Here, as image data according to the present embodiment, for example, RAW data are cited. In this connection, the image data according to the present embodiment may be data in which an arbitrary process corresponding to a utilization purpose of a captured image has been performed for RAW data, such as data in which RAW data have been subjected to lossless compression.

As the imaging for obtaining a captured image including a photographic subject according to the present embodiment, imaging of an acquisition region set in the field angle of an imaging device is cited. The acquisition region according to the present embodiment, for example, is a region of the whole field angle of the imaging device or a part of a region within the field angle of the imaging device that makes it possible to image the whole photographic subject.

As mentioned later, in the case where a photographic subject has been detected on the basis of a captured image (the first captured image) in which the detection region has been imaged, the control device according to the present embodiment makes it perform imaging of an acquisition region. That is, a photographic subject will be included in the captured image (the second captured image) in which the acquisition region has been imaged.

The control device according to the present embodiment, for example, as mentioned in the above, controls imaging in the imaging device and makes the imaging device perform the imaging of the detection region, or the imaging of the acquisition region.

Here, as mentioned in the above, since it may be permissible for the detection region to be a part of a region in the field angle that makes it possible to image at least a part of a photographic subject, the reduction of an amount of data of image data showing a captured image (the first captured image) in which the detection region has been imaged, is attempted.

Moreover, as mentioned in the above, since the acquisition region is a region of the whole field angle of the imaging device or a part of a region within the field angle of the imaging device that makes it possible to image the whole photographic subject, the photographic subject will be included in the captured image (the second captured image) in which the acquisition region has been imaged.

Therefore, the control device according to the present embodiment can obtain a captured image including a photographic subject while reducing an amount of data.

Moreover, in the case where the control method according to the present embodiment is used, the acquisition of a captured image including a photographic subject is realized by imaging in one imaging device. Therefore, in the case where the control method according to the present embodiment is used, as compared with a case where a captured image including a photographic subject is acquired by imaging in a plurality of imaging devices, it is possible to make an imaging delay smaller. Accordingly, in the case where the control method according to the present embodiment is used, it is possible to acquire an image of a photographic subject with a larger moving speed more surely than a case where a captured image including the photographic subject is acquired by imaging in a plurality of imaging devices.

In this connection, the processes related to the control method according to the present embodiment are not limited to the processes shown in the above.

For example, the control device according to the present embodiment may control the output of a captured image imaged by the imaging device being controlled.

As the control of the output of a captured image in the control device according to the present embodiment, for example, one or both of the control of transmission of image data showing a captured image to an external device and the control of recording of image data showing a captured image into a recording medium is or are cited.

In the case of performing the control of the above-described transmission as the control of the output of a captured image, the control device according to the present embodiment, for example, controls the communication in a communication section (mentioned later), or an external communication device connected to the control device according to the present embodiment, and makes it transmit image data to an external device. Moreover, in the case of performing the control of the above-described recording as the control of the output of a captured image, the control device according to the present embodiment, for example, sends control signals including a recording instruction and image data to one or two or more of a memory section (mentioned later), an external recording medium connected to the control device according to the present embodiment, and a recording medium equipped in an external device.

The control device according to the present embodiment, for example, controls the output of an image (the second captured image) in which the acquisition region has been imaged, on the basis of the detection result of a photographic subject based on a captured image (the first captured image) in which the detection region has been imaged. In the case where a photographic subject has been detected, the control device according to the present embodiment controls the output of an image (the second captured image) in which the acquisition region has been imaged.

Moreover, the control device according to the present embodiment, for example, may control the output of the captured image (the first captured image) in which the detection region has been imaged, on the basis of the detection result of the photographic subject based on the captured image (the first captured image) in which the detection region has been imaged. Moreover, the control of the output of the captured image (the first captured image) in which the detection region has been imaged, for example, may be performed in the case where a predetermined operational mode (for example, a test mode, an evaluation mode, etc. set at the time of performing initial setting, performing evaluation, or the like) has been set on the basis of operation of a user of the control device according to the present embodiment.

[2] One Example of Processes Related to Control Method According to Present Embodiment Hereinafter, one example of processes related to the control method according to the present embodiment is described, while citing a setting example of a detection region according to the present embodiment and an acquisition region according to the present embodiment.

As the setting example of a detection region according to the present embodiment and an acquisition region according to the present embodiment, for example, examples shown in the following (A) through (D) are cited. In this connection, the setting examples of a detection region according to the present embodiment and an acquisition region according to the present embodiment are not limited to the examples shown in the below. For example, in the case where the imaging device includes a stacked type region ADC (Analog-to-Digital Converter), as a detection region, it is possible to set a region of an arbitrary shape that can be set in the field angle of the imaging device, such as a region in which a length in the vertical direction is longer than a length in the horizontal direction.

(A) First Setting Example of Detection Region and Acquisition Region

FIG. 1 is an explanatory illustration showing the first setting example of a detection region according to the present embodiment and an acquisition region according to the present embodiment. FIG. 1 shows one example of a detection region and an acquisition region in the region of the whole field angle of an imaging device. "ROI1" shown in FIG. 1 corresponds to one example of the detection region, and "ROI2" shown in FIG. 1 corresponds to one example of the acquisition region.

In the below, a part of a region of the field angle of the imaging device is denoted as "ROI" (Region Of Interest). Moreover, in the below, a detection region may be denoted as "detection region ROI1", and an acquisition region may be denoted as "acquisition region ROI2". In this connection, as mentioned in the above, the acquisition region is not limited to a part of a region of the field angle of the imaging device, and may be the region of the whole field angle of the imaging device.

The control device according to the present embodiment makes the imaging device image the detection region ROI1, and detects a photographic subject on the basis of the captured image (the first captured image) in which the detection-region ROI1 has been imaged.

In the case where a photographic subject is not detected on the basis of the captured image in one frame in which the detection region ROI1 has been imaged, the control device according to the present embodiment makes it image the detection region ROI1 in the next frame.

Here, as mentioned in the above, it may be permissible for the detection region ROI1 to be a part of a region within the field angle that makes it possible to image at least a part of a photographic subject. Therefore, for example, the control device according to the present embodiment increases a frame rate than a case of imaging an acquisition region, and then, makes it image the detection region ROI1.

Moreover, in the case where a photographic subject has been detected on the basis of the captured image in one frame in which the detection region ROI1 has been imaged, the control device according to the present embodiment makes it image the acquisition region ROI2 in the next frame. In the first example shown in FIG. 1, the control device according to the present embodiment makes it perform imaging of the acquisition region at a predetermined timing having been set corresponding to an imaging delay time having been set beforehand.

In the first setting example of the detection region and the acquisition region, for example, the imaging in the imaging device is controlled as described in the above.

Here, in the case where a photographic subject has been detected on the basis of the captured image in which the detection region ROI1 has been imaged, the imaging of the acquisition region ROI2 is performed. That is, the imaging of the acquisition region ROI2 is automatically performed by making the detection of the photographic subject on the basis of the captured image in which the detection region ROI1 has been imaged, a trigger.

In addition, as mentioned in the above, since it may be permissible for the detection region ROI1 to be a part of a region in the field angle that makes it possible to image at least a part of a photographic subject, the reduction of an amount of data of image data showing a captured image (the first captured image) in which the detection region ROI1 has been imaged, is attempted.

Moreover, as mentioned in the above, since the acquisition region ROI2 is a region of the whole field angle of the imaging device or a part of a region within the field angle of the imaging device that makes it possible to image the whole photographic subject, the photographic subject will be included in the captured image (the second captured image) in which the acquisition region ROI2 has been imaged.

Therefore, in the first setting example of the detection region and the acquisition region, by performing the imaging of the detection region ROI1 or the imaging of the acquisition region ROI2, the control device according to the present embodiment can obtain a captured image including a photographic subject while reducing an amount of data.

Figure 2:
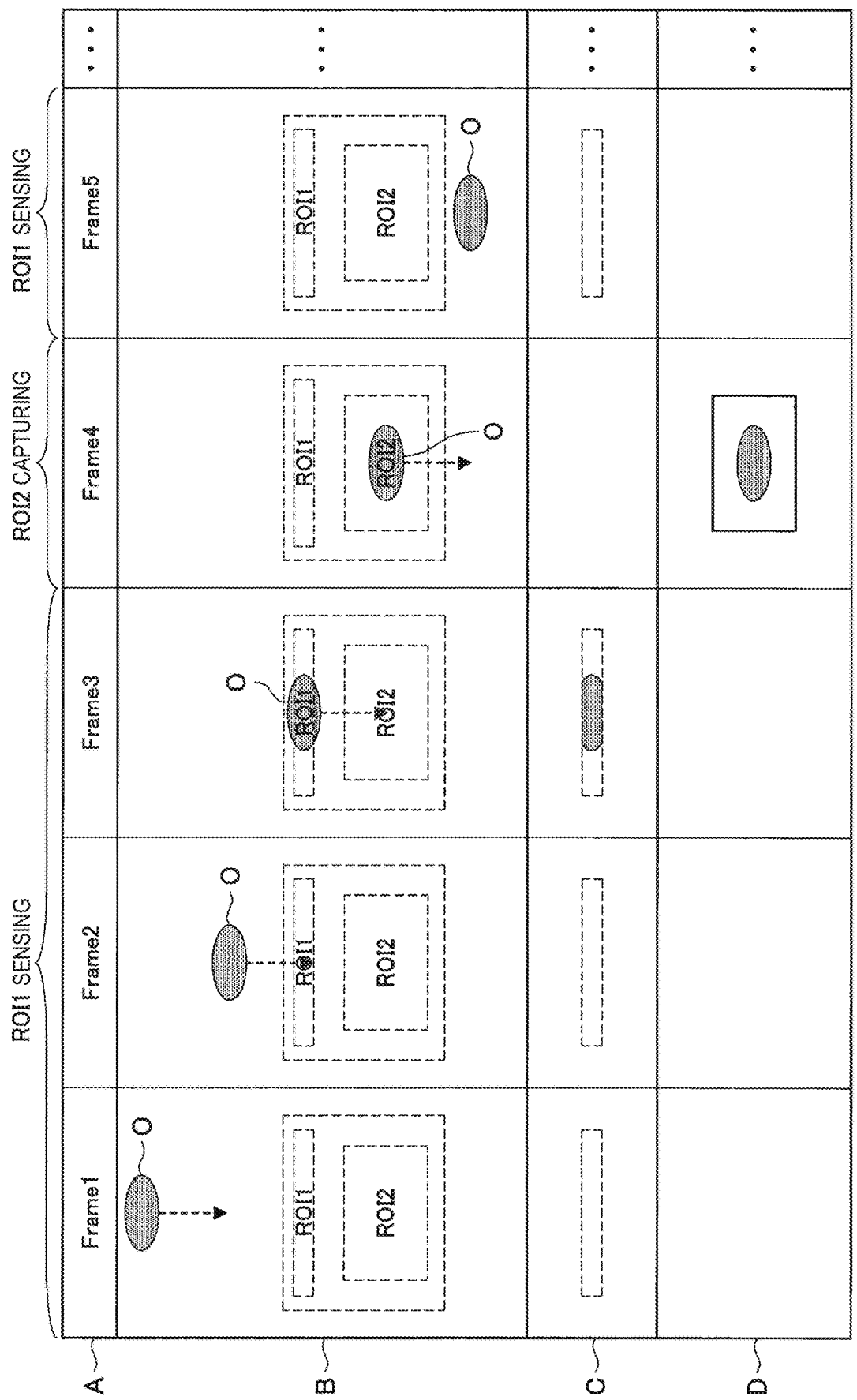
FIG. 2 is an explanatory illustration for describing one example of processes related to a control method according to the present embodiment.

FIG. 2 is an explanatory illustration for describing one example of processes related to the control method according to the present embodiment, and shows one example of a flow of the processes in the first setting example of the detection region and the acquisition region. A in FIG. 2 shows one example of frame numbers imaged by the imaging device, and in FIG. 2, the first frame ("Frame1" shown in FIG. 2) through the fifth frame ("Frame5" shown in FIG. 2), . . . are shown. B in FIG. 2 shows one example of a relationship between a region of the whole field angle in an imaging device and an object O capable of becoming a photographic subject in each frame. C in FIG. 2 shows one example of a captured image (the first captured image) in each frame in which a detection region ROI1 has been imaged. Moreover, D in FIG. 2 shows one example of a captured image (the second captured image) in which an acquisition region ROI2 has been imaged.

FIG. 2 shows one example of a flow of processes related to the control method according to the present embodiment in the case where the object O moves along a path passing through the inside of the field angle of the imaging device at a fixed speed.

First, the control device according to the present embodiment makes the imaging device perform the imaging of the detection-region ROI1 for each frame, and performs a process of detecting a photographic subject on the basis of the captured image in which the detection region ROI1 has been imaged.

Here, in the first frame ("Frame1" shown in FIG. 2), and the second frame ("Frame2" shown in FIG. 2), as shown in B in FIG. 2, the object O does not exist within the field angle of the imaging device. At this time, as shown in C in FIG. 2, since the object O is not included in the captured image in which the detection region ROI1 has been imaged, by performing a later-mentioned detecting process of a photographic subject, the control device according to the present embodiment does not determine that the photographic subject has been detected from the captured image.

In the case where it is not determined that the photographic subject has been detected from the captured image in which the detection region ROI1 has been imaged, the control device according to the present embodiment, for example, does not make it output the image data showing the captured image in which the detection region ROI1 has been imaged. In this connection, as mentioned in the above, in the case where it is not determined that the photographic subject has been detected from the captured image in which the detection region ROI1 has been imaged, the control device according to the present embodiment may make it output the image data showing the captured image in which the detection region ROI1 has been imaged.

Moreover, in the third frame ("Frame3" shown in FIG. 2), as shown in B in FIG. 2, the object O exists in the detection region ROI1 within the field angle of the imaging device. Here, as mentioned in the above, since it is possible for the control device according to the present embodiment to increase the frame rate of the imaging of the detection region ROI1, it is possible to realize a situation where the object O as shown in the third frame in FIG. 2 exists in the detection region ROI1.

At this time, as shown in C in FIG. 2, since the object O is included in the captured image in which the detection region ROI1 has been imaged, by performing a later-mentioned detecting process of a photographic subject, the control device according to the present embodiment determines that the photographic subject has been detected from the captured image.

In the case where it is determined that the photographic subject has been detected from the captured image in which the detection region ROI1 has been imaged, the control device according to the present embodiment, for example, does not make it output the image data showing the captured image in which the detection region ROI1 has been imaged. In this connection, as mentioned in the above, in the case where it is determined that the photographic subject has been detected from the captured image in which the detection region ROI1 has been imaged, the control device according to the present embodiment may make it output the image data showing the captured image in which the detection region ROI1 has been imaged.

Upon making the determination that the photographic subject has been detected in the third frame ("Frame3" shown in FIG. 2), in the fourth frame ("Frame4" shown in FIG. 2) being the next frame, the control device according to the present embodiment makes the imaging device perform the imaging of the acquisition region ROI2. The control device according to the present embodiment makes it perform the imaging of the acquisition region ROI2 at a predetermined timing having been set correspondingly to the imaging delay time having been set beforehand.

At this time, as shown in D in FIG. 2, the object O will be included in the captured image in which the acquisition region ROI2 has been imaged. The control device according to the present embodiment, for example, makes it output the image data showing the captured image (the second captured image) in which the acquisition region ROI2 has been imaged.

Upon making the imaging device perform the imaging of the acquisition region ROI2 in the fourth frame ("Frame4" shown in FIG. 2), in the fifth frame ("Frame5" shown in FIG. 2) being the next frame, the control device according to the present embodiment makes the imaging device perform the imaging of the detection region ROI1 for each frame similarly to the first frame. Then, the control device according to the present embodiment performs the process of detecting a photographic subject on the basis of the captured image in which the detection region ROI1 has been imaged.

In on and after the sixth frame, processes similar to the processes in on and after the first frame shown in FIG. 2 are performed.

Figure 3:
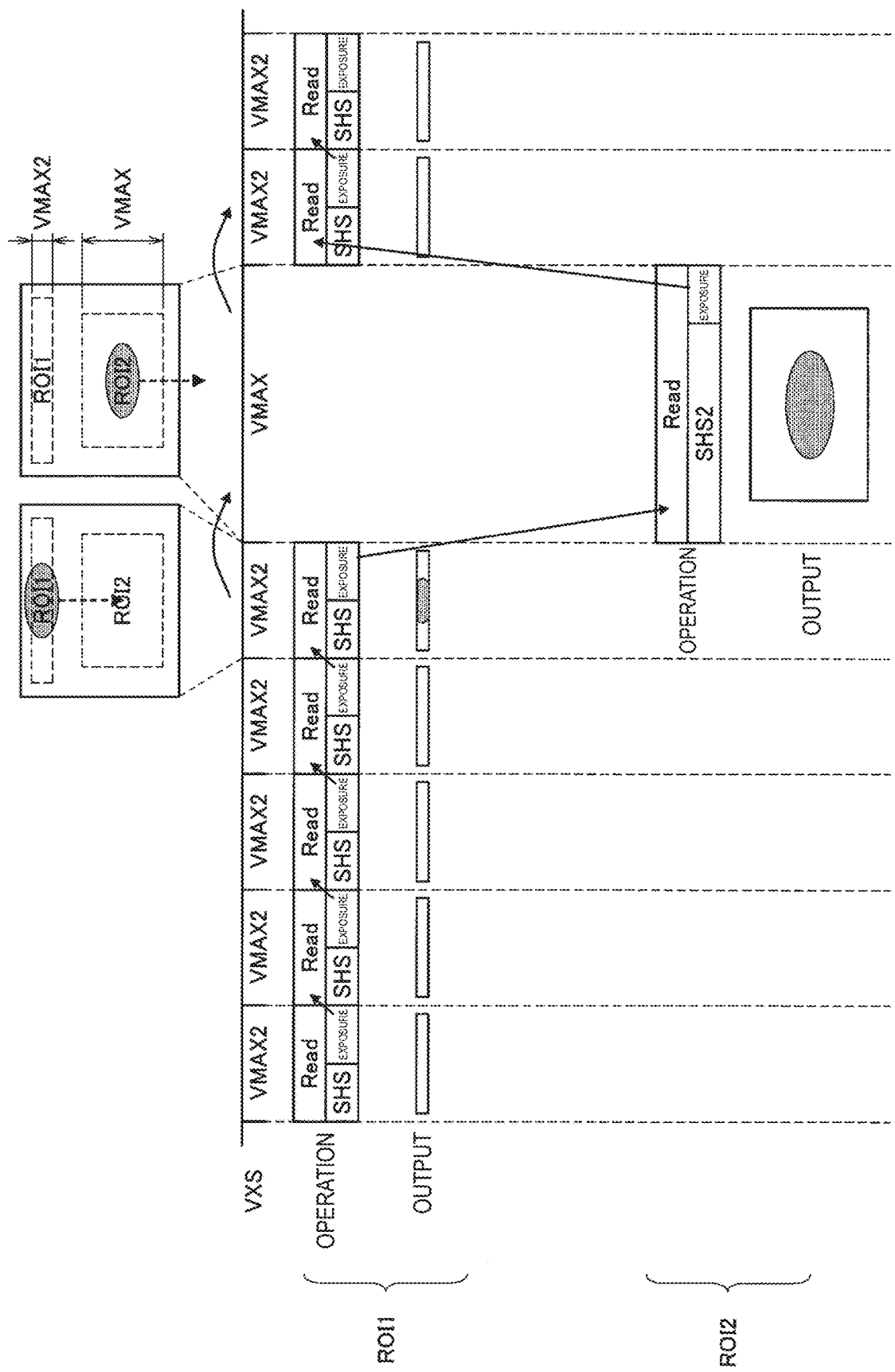
FIG. 3 is an explanatory illustration for describing one example of processes related to a control method according to the present embodiment.

FIG. 3 is an explanatory illustration for describing one example of processes related to the control method according to the present embodiment, and shows the flow of processes related to the control method according to the present embodiment shown in FIG. 2 from another viewpoint. FIG. 2 shows one example of an operation of the imaging device in the detection region ROI1 and an operation of the imaging device in the acquisition region ROI2 that are realized by the control of the imaging device by the control device according to the present embodiment.

"XVS" A shown in FIG. 3 denotes a vertical synchronous signal in the imaging device. In the example shown in FIG. 3, the imaging of the detection region ROI1 is performed by the vertical synchronous signal VMAX2. Moreover, in the example shown in FIG. 3, the imaging of the acquisition region ROI2 is performed by the vertical synchronous signal VMAX.

"Read" shown in FIG. 3 denotes a read-out period in which the signals corresponding to photoelectric conversion from respective pixels of the imaging device correspondingly to the detection region ROI1 or the acquisition region ROI2, are read out. Moreover, "SHS" shown in FIG. 3 denotes a period in which the setting of a shutter of the imaging device in the detection region ROI1 is performed, and "SHS2" shown in FIG. 3 denotes a period in which the setting of a shutter of the imaging device in the acquisition region ROI2 is performed.

"Exposure" shown in FIG. 3 denotes an exposure period in the imaging device. Here, FIG. 3 shows an example in which the exposure period in the case of imaging the detection region ROI1 is the same as the exposure period in the case of imaging the acquisition region ROI2. In FIG. 3, the reason why the exposure period in the case of imaging the detection region ROI1 is made the same as the exposure period in the case of imaging the acquisition region ROI2, is that in the case of imaging the detection region ROI1 and the acquisition region ROI2 with one imaging device, it is because it is thought that the lighting conditions related to the imaging are the same.

In this connection, the control device according to the present embodiment may change the exposure period in the case of imaging a detection region ROI1 and the exposure period in the case of imaging an acquisition region ROI2 on the basis of, for example, the detection result of a photographic subject based on a captured image (the first captured image) in which a detection region ROI1 has been imaged, the detection result of the environment in the vicinity of an imaging device, and so on.

For example, in the case where a photographic subject has been detected on the basis of a captured image in which a detection region ROI1 has been imaged, the control device according to the present embodiment changes the exposure period in the case of imaging an acquisition region ROI2 from the exposure period in the case of imaging the detection region ROI1. Moreover, for example, on the basis of the detection result (an example of the detection result of the environment in the vicinity of an imaging device) of luminance or illuminance in the vicinity of the imaging device, the control device according to the present embodiment makes it set an exposure period corresponding to the detection result. The above-described luminance or illuminance in the vicinity of the imaging device is acquired by a sensor capable of sensing the environment, such as a luminance sensor, an illuminance sensor, and so on.

For example, as shown in FIG. 3, on the basis of the detection result of the photographic subject based on a captured image (the first captured image) in which the detection region ROI1 has been imaged, the control device according to the present embodiment makes it switch over the imaging of the detection region ROI1 and the imaging of the acquisition region ROI2 and perform the imaging.

In this connection, although FIG. 3 shows an example where the control device according to the present embodiment makes it output the captured image (the first captured image) in which the detection region ROI1 has been imaged, as mentioned in the above, the control device according to the present embodiment may not make it output the captured image in which the detection region ROI1 has been imaged.

In the first setting example of the detection region and the acquisition region, the control device according to the present embodiment, for example, performs the processes as shown with reference to FIG. 2. Moreover, in the first setting example of the detection region and the acquisition region, by the processes by the control device according to the present embodiment, for example, the operation of the imaging device as shown with reference to FIG. 3 is realized.

(B) Second Setting Example of Detection Region and Acquisition Region

In the first setting example of the detection region and the acquisition region, the example where the detection region and the acquisition region are set one by one, has been shown. However, the setting example of the detection region and the acquisition region according to the present embodiment is not limited to the above-described first setting example.

For example, in the detection region ROI1 according to the present embodiment, a plurality of detection regions may be set independently. In the case where a plurality of detection regions are set independently, the control device according to the present embodiment detects a photographic subject for each of the plurality of detection regions on the basis of a captured image (the first captured image) in which a detection region corresponding to each of the plurality of detection regions has been imaged. The detecting process of a photographic subject in each of the plurality of detection regions is similar to the process in the above-described first setting example of the detection region and the acquisition region.

Moreover, in the case where the plurality of detection regions are set independently, an acquisition region ROI2 according to the present embodiment is set for each of the plurality of detection regions. In the case where an acquisition region is set for each of the plurality of detection regions, the control device according to the present embodiment makes the imaging device perform the imaging of an acquisition region corresponding to a detection region in which a photographic subject has been detected. Processes related to the control of the imaging of the acquisition region corresponding to the detection region in which the photographic subject has been detected are similar to the processes in the above-described first setting example of the detection region and the acquisition region.

Figure 4:
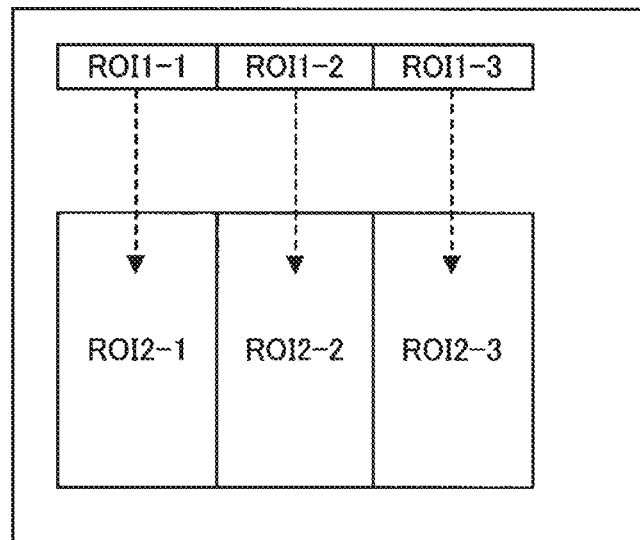
FIG. 4 is an explanatory illustration showing the second setting example of a detection region according to the present embodiment and an acquisition region according to the present embodiment.

FIG. 4 is an explanatory illustration showing the second setting example of a detection region according to the present embodiment and an acquisition region according to the present embodiment. FIG. 4 shows "an example where a plurality of detection regions are set independently in the region of the whole field angle of an imaging device and an acquisition region is set for each of the plurality of detection regions". "ROI1-1", "ROI1-2", and "ROI1-3" that are shown in FIG. 4 correspond to one example of a plurality of detection regions to be set independently. Moreover, "ROI2-1" shown in FIG. 4 denotes an acquisition region corresponding to the detection region ROI1-1. Moreover, moreover, "ROI2-2" shown in FIG. 4 denotes an acquisition region corresponding to the detection region ROI1-2, and "ROI2-3" shown in FIG. 4 denotes an acquisition region corresponding to the detection region ROI1-3.

In the case where the detection regions and the acquisition regions are set as shown in FIG. 4, the control device according to the present embodiment detects a photographic subject for each of the plurality of the detection regions ROI1-1, ROI1-2, and ROI1-3 on the basis of a captured image (the first captured image) in which a detection region corresponding to each of the plurality of the detection region ROI1-1, ROI1-2, and ROI1-3 has been imaged. Then, the control device according to the present embodiment makes the imaging device perform the imaging of an acquisition region corresponding to a detection region in which the photographic subject has detected, among the plurality of the acquisition regions ROI2-1, ROI2-2, and ROI2-3.

In the second setting example of the detection region and the acquisition region, the control device according to the present embodiment performs processes similar to the processes in the above-described first setting example of the detection region and the acquisition region for each combination of the detection region and the acquisition region.

Therefore, in the second setting example of the detection region and the acquisition region, by performing the imaging of the detection region or the imaging of the acquisition region, the control device according to the present embodiment can obtain a captured image including a photographic subject while reducing an amount of data.

Moreover, in the second setting example of the detection region and the acquisition region, for example as shown in FIG. 4, the size of the detection region and the size of the acquisition region become smaller than those in the above-described first setting example of the detection region and the acquisition region. Therefore, in the second setting example of the detection region and the acquisition region, it is possible to reduce an amount of data than that in the above-described first setting example of the detection region and the acquisition region.

(C) Third Setting Example of Detection Region and Acquisition Region

In the second setting example of the detection region and the acquisition region, the example where a plurality of detection regions are set independently, has been shown. However, the example of setting a plurality of detection regions is not limited to the above-described second setting example.

For example, in the field angle of an imaging device, as the detection region ROI1, a first detection region and a second detection region corresponding to the first detection region may be set. Here, the second detection region according to the present embodiment is, for example, as mentioned later, a detection region set in order to obtain the movement speed of a photographic subject.

As described in the above, in the case where a set of detection regions called the first detection region and the second detection region is set, the control device according to the present embodiment detects a photographic subject on the basis of each of the captured image (the first captured image) corresponding to the first detection region and the captured image (the first captured image) corresponding to the second detection region. The detecting process of a photographic subject in each of the first detection region and the second detection region is similar to the process in the above-described first setting example of the detection region and the acquisition region.

Moreover, the control device according to the present embodiment detects the movement speed of a photographic subject on the basis of the detection result of the photographic subject in each of the first detection region and second detection region. The movement speed of a photographic subject, for example, is obtained from "a distance between the first detection region and the second detection region on the basis of the positions of the first detection region and the second detection region within the field angle of the imaging device" and "the time after a photographic subject has been detected in the first detection region until the photographic subject is detected in the second detection region".

Then, the control device according to the present embodiment makes it perform the imaging of the acquisition region ROI2 at a timing based on the detected movement speed. Processes related to the control of the imaging of the acquisition region corresponding to the first detection region in which the photographic subject has been detected is basically similar to the processes in the above-described first setting example of the detection region and the acquisition region. In more concrete terms, the imaging of the acquisition region in the third setting example of the detection region and the acquisition region and the imaging of the acquisition region in the first setting example of the detection region and the acquisition region are similar to each other, except that they are different in timing to make it perform the imaging of the acquisition region ROI2.

Figure 5:
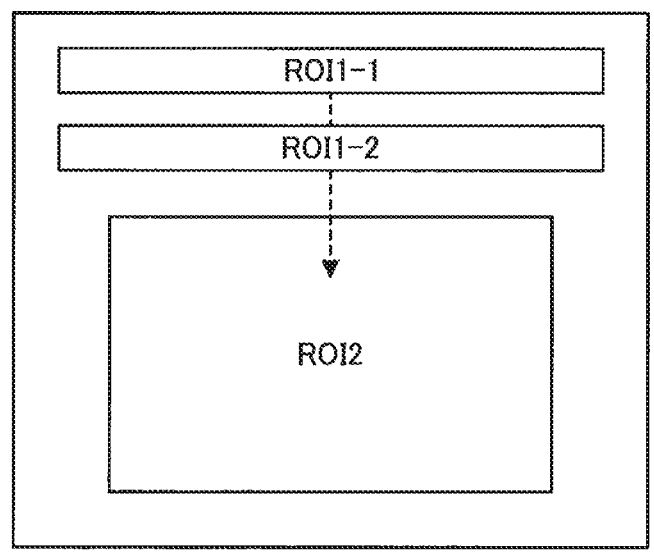
FIG. 5 is an explanatory illustration showing the third setting example of a detection region according to the present embodiment and an acquisition region according to the present embodiment.

FIG. 5 is an explanatory illustration showing the third setting example of a detection region according to the present embodiment and an acquisition region according to the present embodiment. FIG. 5 shows "an example where a set of detection regions including two detection regions is set in the region of the whole field angle of an imaging device and an acquisition region is set for the set of detection regions". "ROI1-1" and "ROI1-2" which are shown in FIG. 5, correspond to an example of the above-described set of detection regions. Moreover, "ROI2" shown in FIG. 5 denotes the acquisition region corresponding to the set of detection regions including the detection region ROI1-1 and the detection region ROI1-2.

In the case where the detection regions and the acquisition region are set as shown in FIG. 5, the control device according to the present embodiment detects a photographic subject on the basis of a captured image (the first captured image) in which the detection region ROI1-1 has been imaged. Moreover, the control device according to the present embodiment detects the movement speed of a photographic subject on the basis of a captured image (the first captured image) in which the detection region ROI1-1 has been imaged and a captured image (the first captured image) in which the detection region ROI1-2 has been imaged.

Then, in the case where a photographic subject is detected on the basis of the captured image (the first captured image) in which the detection region ROI1-1 has been imaged, the control device according to the present embodiment makes the imaging device perform the imaging of the acquisition region ROI2 at a timing corresponding to an imaging delay time based on the movement speed of the above-described detected photographic subject. The control device according to the present embodiment specifies the imaging delay time based on the movement speed of a photographic subject by, for example, using a table (or, data base) where the movement speed and the imaging delay time are associated with each other.

In the third setting example of the detection region and the acquisition region, for the set of detection regions and the acquisition region, the control device according to the present embodiment performs processes basically similar to those in the above-described first setting example of the detection region and the acquisition region.

Therefore, in the third setting example of the detection region and the acquisition region, by performing the imaging of the detection region ROI1 (first detection region and second detection region) or the imaging of the acquisition region ROI2, the control device according to the present embodiment can obtain a captured image including a photographic subject while reducing an amount of data.

Moreover, in the third setting example of the detection region and the acquisition region, the imaging of the acquisition region ROI2 is performed at a timing based on the movement speed of the detected photographic subject. Therefore, in the third setting example of the detection region and the acquisition region, even in the case where the movement speed of the photographic subject becoming a detection target is different for each photographic subject, a captured image including a photographic subject can be obtained more reliably.

(D) Fourth Setting Example of Detection Region and Acquisition Region

A setting example of the detection region and the acquisition region may be a combination of the above-described second setting example of the detection region and the acquisition region and the above-described third setting example of the detection region and the acquisition region. As the fourth setting example of the detection region and the acquisition region, for example, an example where the second detection region is set further for each of the detection region ROI1-1 through the detection region ROI1-3 shown in FIG. 4, is cited.

(Control Device According to Present Embodiment)

Next, processes related to the control method according to the present embodiment are described more concretely while describing an example of a constitution of the control device according to the present embodiment that can perform the processes related to the control method according to the above-mentioned present embodiment.

Figure 6:
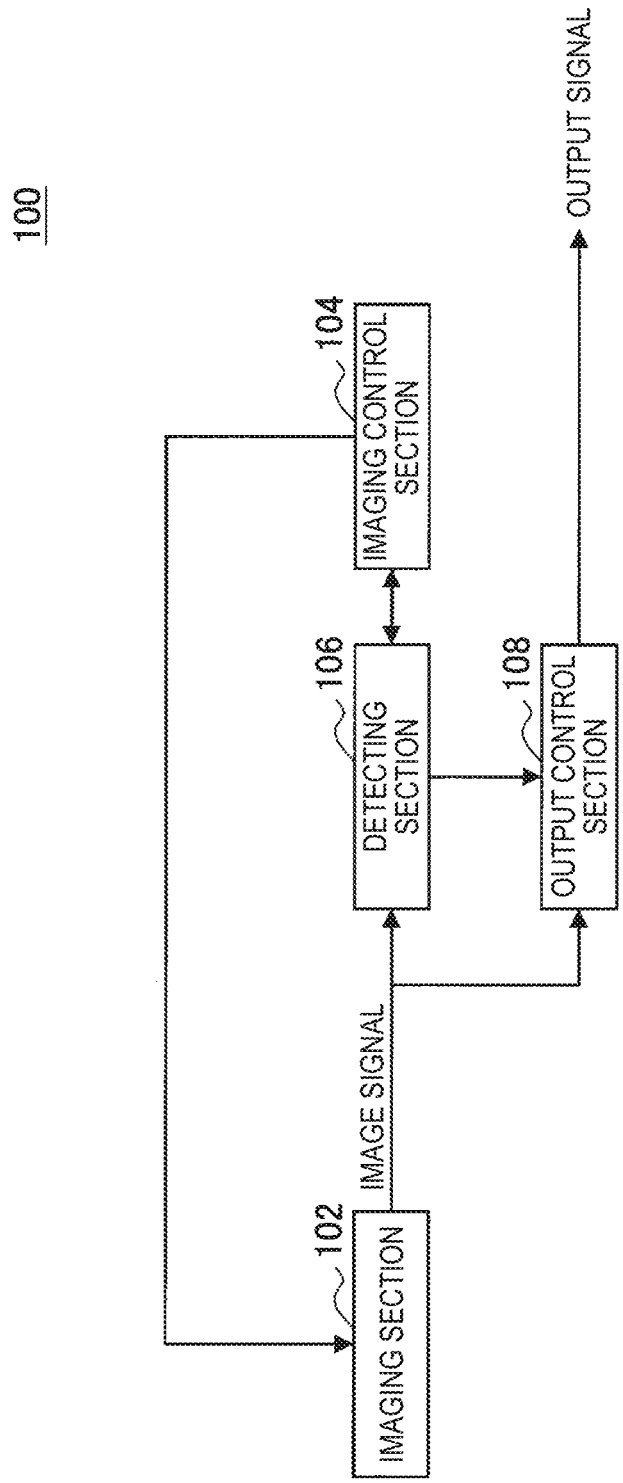
FIG. 6 is a block diagram showing one example of a constitution of a control device according to the present embodiment.

FIG. 6 is a block diagram showing one example of a constitution of a control device 100 according to the present embodiment. The control device 100, for example, includes an imaging section 102, an imaging control section 104, a detecting section 106, and an output control section 108.

Moreover, the control device 100, for example, includes a control section (not shown), a ROM (Read Only Memory, not shown), a RAM (Random Access Memory, not shown), a memory section (not shown), a communication section (not shown), an operating section (not shown) that allows a user to operate, a display section (not shown) that displays various screens on a display screen, and so on. The control device 100 connects between the above-described constitution components via, for example, buses as data transmission paths.

The control section (not shown) includes one or two or more processors including an arithmetic circuit such as an MPU (Micro Processing Unit), various processing circuits, and so on, and controls the whole control device 100. Moreover, a control section (not shown) may achieve, in the control device 100, for example, one or two or more roles of the imaging control section 104, the detecting section 106, and the output control sections 108.

In this connection, one or two or more of the imaging control section 104, the detecting section 106, and the output control sections 108 may be constituted by a dedicated (or, general-purpose) circuit (for example, a processor etc. separated from the control section (not shown)) capable of realizing the process of each of the imaging control section 104, the detecting section 106, and the output control sections 108.

The ROM (not shown) memorizes programs used by the control section (not shown) and data for control, such as arithmetic parameters. The RAM (not shown) memorizes temporarily programs etc. executed by the control section (not shown).

The memory section (not shown) is a memory means equipped in the control device 100, and memorizes, for example, various data such as data related to the control method according to the present embodiments, such as a table (or data base) in which the movement speed and the imaging delay time are associated with each other, and various applications.

Here, as the memory section (not shown), for example, magnetic recording media, such as a hard disk (Hard Disk), nonvolatile memories (nonvolatile memory), such as a flash memory (flash memory), and so on, are cited. Moreover, the memory section (not shown) may be detachable from the control device 100.

As the communication section (not shown), for example, a later-mentioned communication interface is cited. Moreover, as the operating section (not shown), for example, a later-mentioned operation input device is cited. Moreover, as the display section (not shown), a later-mentioned display device is cited.

[Example of Hardware Constitution of Control Device 100]

Figure 7:
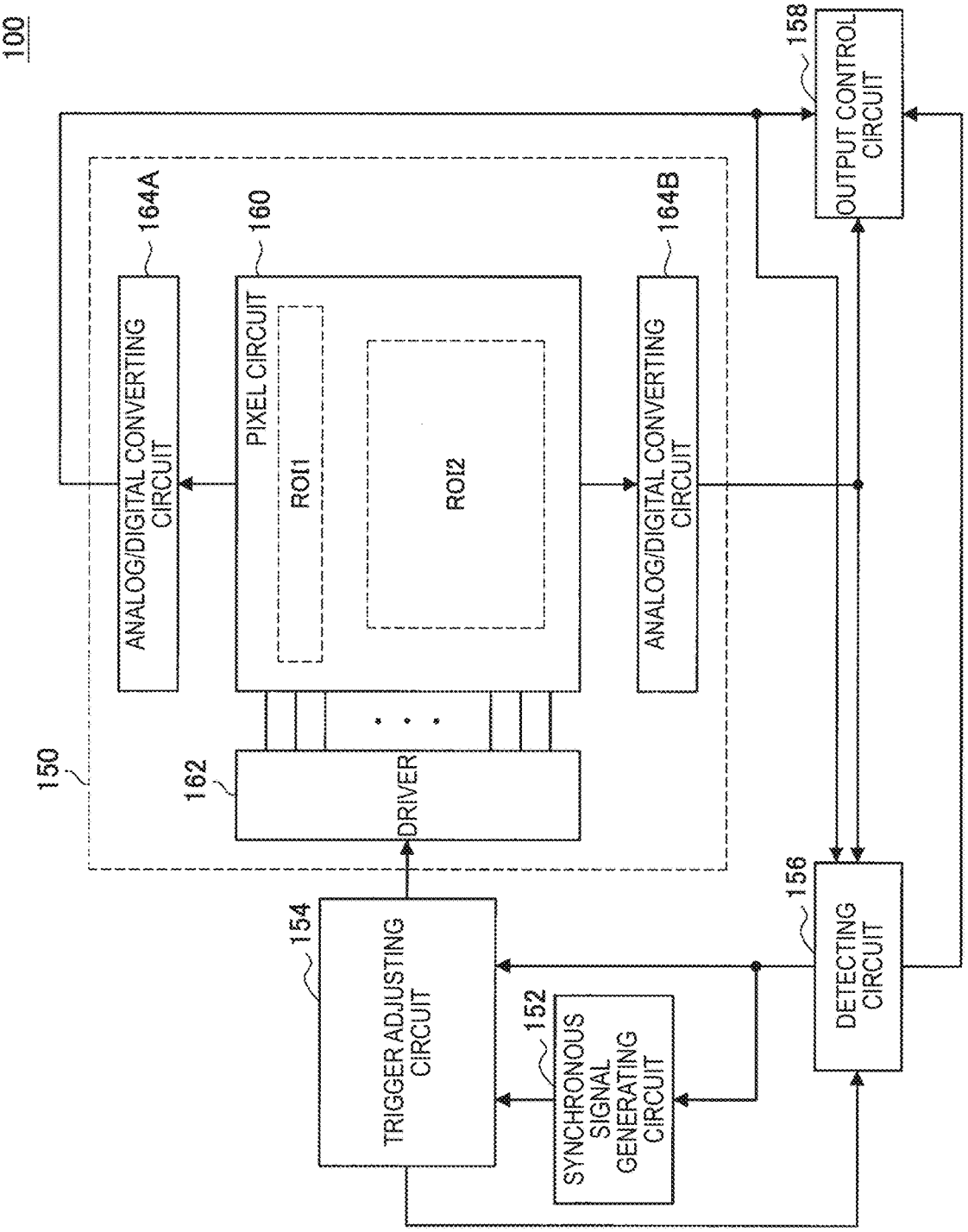
FIG. 7 is an explanatory diagram showing one example of a hardware constitution of a control device according to the present embodiment.

FIG. 7 is an explanatory diagram showing one example of a hardware constitution of the control device 100 according to the present embodiment.

The control device 100 includes, for example, an imaging device 150, a synchronous signal generating circuit 152, a trigger adjusting circuit 154, a detecting circuit 156, and an output control circuit 158. Moreover, the control device 100 is driven, for example, by an electric power supplied from an internal electrical power source such as a battery equipped in the control device 100 or an electric power supplied from a connected external electrical power source.

The imaging device 150 functions as the imaging section 102. The imaging device 150 includes, for example, a lens (not shown) of an optical system, an image sensor (not shown), such as a CMOS, a pixel circuit 160 corresponding to an image sensor (not shown), a driver 162, and analog/digital converting circuits 164A and 164B.

The pixel circuit 160 includes, for example, a light receiving element, such as a photodiode, a transistor, a capacitive element, and so on, in which accumulation of signal charges according to photoelectric conversion in each pixel, initialization of each pixel, etc. are performed in accordance with signals transmitted from the driver 162. As the above-described transistor, for example, a bipolar transistor, a FET (Field-Effect Transistor), such as a TFT (Thin Film Transistor) and a MOSFET (Metal-Oxide-Semiconductor Field Effect Transistor), and so on, are cited. Moreover, as the capacitive element, a capacitor etc. are cited.

The driver 162 drives a pixel circuit by transmitting signals to the pixel circuit 160.

Each of the analog/digital converting circuits 164A and 164B converts analog signals corresponding to photoelectric conversion from each pixel into digital signals (image data).

The imaging device 150 includes, for example, the constitution as described in the above. In this connection, the constitution of the imaging device 150 is not limited to the example shown in the above, and the imaging device 150 may be equipped with an AGC (Automatic Gain Control) circuit and the like.

The synchronous signal generating circuit 152 and the trigger adjusting circuit 154 function as the imaging control section 104. In the control device 100, for example, a processor that constitutes the control section (not shown) may function as each of the synchronous signal generating circuit 152 and the trigger adjusting circuit 154, or the synchronous signal generating circuit 152 and the trigger adjusting circuit 154 may be provided as a circuit separated from the processor that constitutes the control section (not shown).

The synchronous signal generating circuit 152 achieves a role to control an imaging start timing, and transmits a signal to control an imaging start timing to the trigger adjusting circuit 154. In the case of citing one example, as an imaging start timing for the acquisition region ROI2 controlled by the synchronous signal generating circuit 152, for example, a predetermined timing corresponding to an imaging delay time having been set beforehand or a timing based on the movement speed of a photographic subject based on the detection result of the detecting circuit 156 is cited.

The trigger adjusting circuit 154 achieves a role to control imaging in each of the detection region ROI1 and the acquisition region ROI2. The trigger adjusting circuit 154 controls imaging in each of the detection region ROI1 and the acquisition region ROI2 by transmitting a control signal to the driver 162.

The detecting circuit 156 functions as the detecting section 106. The detecting circuit 156 detects a photographic subject on the basis of a captured image (the first captured image) in which the detection region ROI1 has been imaged. The detecting circuit 156, for example, recognizes that the detection region ROI1 has been imaged by a signal transmitted from the trigger adjusting circuit 154. In the control device 100, for example, the processor that constitutes the control section (not shown) may function as the detecting circuit 156, or, the detecting circuit 156 may be provided as a circuit separated from the processor that constitutes the control section (not shown).

In concrete terms, the detecting circuit 156 detects a photographic subject by performing, for example, a detecting process related to a first example shown in (a) described in the below, or a detecting process related to a second example shown in (b) described in the below.

(a) First Example of Detecting Process

The detecting circuit 156 detects a photographic subject on the basis of a comparison result between a captured image (the first captured image) in which the detection region ROI1 has been imaged and a threshold having been set. As the threshold having been set, for example, one or both of a threshold TH1 (a first threshold) and a threshold TH2 (a second threshold) smaller than the threshold TH1, is or are cited.

The threshold TH1 and the threshold TH2 may be a fixed threshold having been set beforehand, or may be a changeable values that can be changed on the basis of an operation etc. of a user of the control device 100. Moreover, the threshold TH according to the present embodiments, such as the threshold TH1, the threshold TH2, and later-mentioned thresholds TH3 through TH5, are memorized in, for example, recording media, such as a register.

(a-1) Detecting Process of Photographic Subject Using Threshold TH1

The detecting circuit 156 counts the number of pixels in which a captured image (the first captured image) in which the detection region ROI1 has been imaged, is larger than the threshold TH1 (the first threshold), or the number of pixels in which the pixel value of the captured image is the threshold TH1 or more.

Here, in the case where each pixel of the imaging device 150 includes sub pixels corresponding to R (Red), G (Green), and B (Blue), the detecting circuit 156 counts the number of pixels on the basis of the pixel value (for example, the total value of Gr and Gb) of G pixels. The reason why the detecting circuit 156 uses the pixel value of G pixels is as follows. In this connection, it goes without saying that, in addition to the counting having been performed for different color, it is possible for the detecting circuit 156 to perform determination related to detection of a photographic subject.

In the case of performing counting for different color, a process related to later-mentioned determination become complicated, and a possibility that erroneous determination will occur, increases.

In the light of G, as compared with other light, the wavelength is broadband, and the sensitivity is also high. Accordingly, in the case of using the pixel value of G pixels, in a process related to later-mentioned determination, it is possible to make determination with sufficient accuracy.

Then, the detecting circuit 156 detects a photographic subject by determining whether the photographic subject has been detected, on the basis of the comparison result between the number of counted pixels and the threshold TH3 (a third threshold) having been set. The threshold TH3 may be a fixed threshold having been set beforehand, or may be a changeable value that can be changed on the basis of an operation etc. of a user of the control device 100.

In more concrete terms, in the case where the number of counted pixels is larger than the threshold TH3 (the third threshold), or in the case where the number of pixels is the threshold TH3 or more, the detecting circuit 156 determines that the photographic subject has been detected. Moreover, in the case where the number of counted pixels is the threshold TH3 or less, or in the case where the number of pixels is smaller than the threshold TH3, the detecting circuit 156 does not determine that the photographic subject has been detected.

(a-2) Detecting Process of Photographic Subject Using Threshold TH2

The detecting circuit 156 counts the number of pixels in which a captured image (the first captured image) in which the detection region ROI1 has been imaged, is smaller than the threshold TH2 (the second threshold), or the number of pixels in which the pixel value of the captured image is the threshold TH2 or more.

Here, in the case where each pixel of the imaging device 150 includes sub pixels corresponding to R, G, and B, the detecting circuit 156 counts the number of pixels on the basis of the pixel value (for example, the total value of Gr and Gb) of G pixels. In this connection, it goes without saying that, in addition to the counting having been performed for different color, it is possible for the detecting circuit 156 to perform determination related to detection of a photographic subject.

Then, the detecting circuit 156 detects a photographic subject by determining whether the photographic subject has been detected, on the basis of the comparison result between the number of counted pixels and the threshold TH4 (a fourth threshold) having been set. The threshold TH4 may be a fixed threshold having been set beforehand, or may be a changeable value that can be changed on the basis of an operation etc. of a user of the control device 100. Moreover, the threshold TH4 and the threshold TH3 may be the same value, or may be different.

In more concrete terms, in the case where the number of counted pixels is larger than the threshold TH4 (the fourth threshold), or in the case where the number of pixels is the threshold TH4 or more, the detecting circuit 156 determines that the photographic subject has been detected. Moreover, in the case where the number of counted pixels is the threshold TH4 or less, or in the case where the number of pixels is smaller than the threshold TH4, the detecting circuit 156 does not determine that the photographic subject has been detected.

(a-3) Detecting Process of Photographic Subject Using Threshold TH1 and Threshold TH2

The detecting circuit 156 performs each of the process shown in the above-described (a-1) and the process shown in the above-described (a-2). Then, in the case where, in at least one of the process shown in the above-described (a-1) or the process shown in the above-described (a-2), it has been determined that the photographic subject has been detected, the detecting circuit 156 determines that the photographic subject has been detected.

(b) Second Example of Detecting Process

The detecting circuit 156 detects a photographic subject on the basis of the comparison result between "a determination value based on a pixel value of a captured image (the first captured image) in the present frame in which the detection region ROI1 has been imaged and a pixel value of a captured image (the first captured image) in the previous frame in which the detection region ROI1 has been imaged" and a threshold TH5 (a fifth threshold) having been set.

As the above-described determination value, for example, cited is a total value of difference values between the pixel value of the captured image (the first captured image) in the present frame in which the detection region ROI1 has been imaged and the pixel value of the captured image (the first captured image) in the previous frame in which the detection region ROI1 has been imaged. Moreover, the above-described determination value may be an average value of the above-described difference values.

Moreover, the threshold TH5 may be a fixed threshold having been set beforehand, or may be a changeable value that can be changed on the basis of an operation etc. of a user of the control device 100.

In more concrete terms, in the case where the above-described determination value is larger than the threshold TH5 (the fifth threshold), or in the case where the above-described determination values is the threshold TH5 or more, the detecting circuit 156 determines that the photographic subject has been detected. Moreover, in the case where the above-described determination value is the threshold TH4 or less, or in the case where the above-described determination value is smaller than threshold TH5, the detecting circuit 156 does not determine that the photographic subject has been detected.

The detecting circuit 156 detects a photographic subject by performing, for example, a detecting process related to a first example shown in (a) described in the below, or a detecting process related to a second example shown in (b) described above.

The output control circuit 158 functions as the output control section 108. The output control circuit 158 controls the output of a captured image imaged by the imaging device 150. In the control device 100, for example, the processor that constitutes the control section (not shown) may function as the output control circuit 158, or the output control circuit 158 may be provided as a circuit separated from the processor that constitutes the control section (not shown).

The output control circuit 158, for example, controls the output of a captured image (the second captured image) in which the acquisition region ROI2 has been imaged, on the basis of the detection result of a photographic subject in the detecting circuit 156. The output control circuit 158 makes it output the captured image in which the acquisition region ROI2 has been imaged, for example, when a signal showing that the photographic subject has been detected has been transmitted from the detecting circuit 156.

In addition, the output control circuit 158 may control the output of a captured image (the first captured image) in which the detection region ROI1 has been imaged, on the basis of the detection result of a photographic subject in the detecting circuit 156. For example, the output control circuit 158 makes it output the captured image in which the detection region ROI1 has been imaged, for example, when a signal showing that no photographic subject has been detected has been transmitted from the detecting circuit 156.

The control device 100, for example, performs processes related to the control method according to the present embodiment by the constitution shown in FIG. 7.

In this connection, the hardware constitution of the control device 100 according to the present embodiment is not limited to the constitution shown in FIG. 7.

Figure 8:
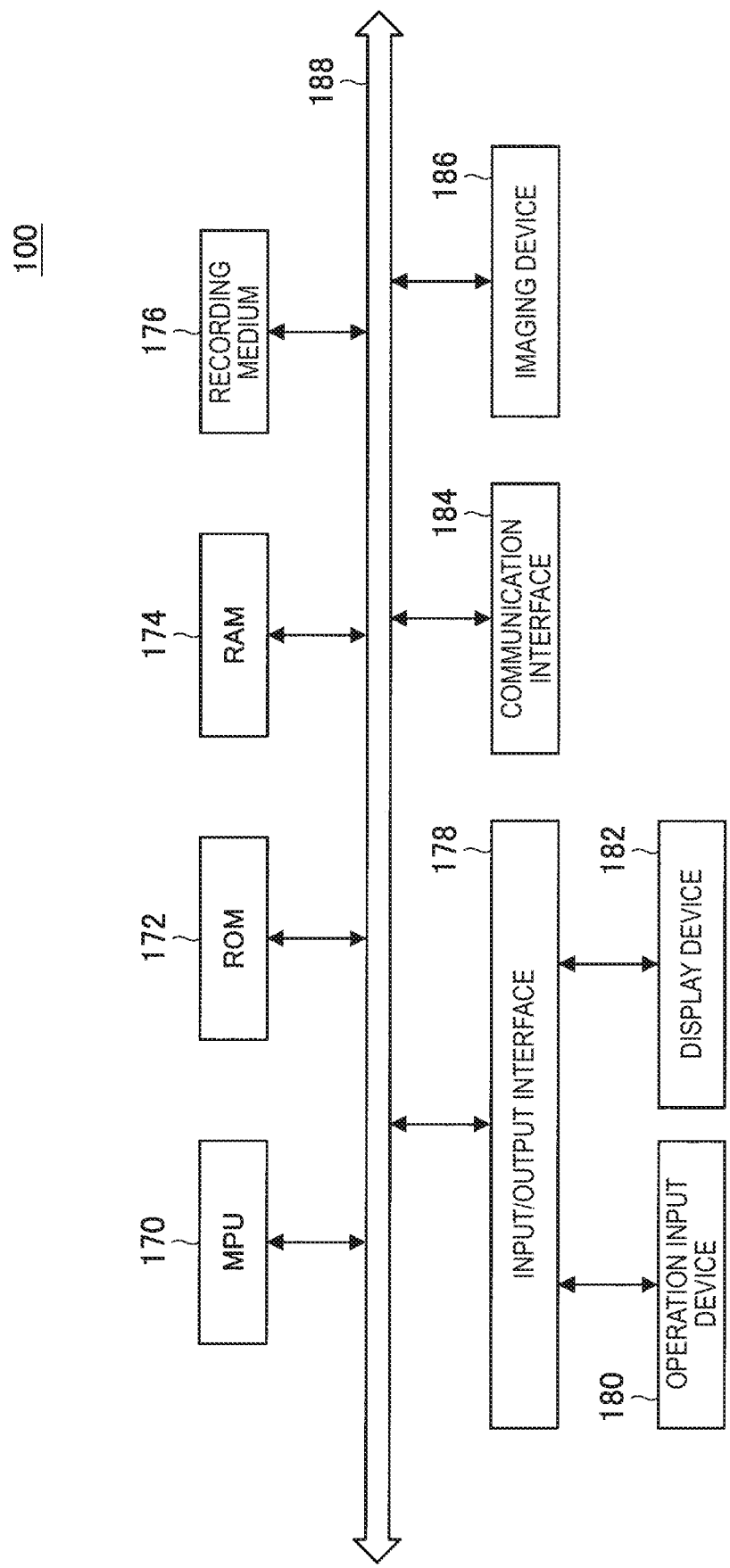
FIG. 8 is an explanatory diagram showing other example of a hardware constitution of a control device according to the present embodiment.

FIG. 8 is an explanatory diagram showing another example of a hardware constitution of the control device 100 according to the present embodiment.

The control device 100 includes, for example, an MPU 170, a ROM 172, a RAM 174, a recording medium 176, an input/output interface 178, an operation input device 180, a display device 182, a communication interface 184, and an imaging device 186. Moreover, the control device 100 connects between respective constitution components by, for example, buses 188 as data transmission paths. Moreover, the control device 100 is driven, for example, by an electric power supplied from an internal electrical power source such as a battery equipped in the control device 100 or an electric power supplied from a connected external electrical power source.

The MPU 170 includes, for example, one or two or more processors including an arithmetic circuit such as an MPU, various processing circuits, and so on, and functions as a control section (not shown) that controls the whole control device 100. Moreover, the MPU 170 may achieve, in the control device 100, for example, roles of the imaging control section 104, the detecting section 106, and the output control sections 108.

In this connection, one or two or more of the imaging control section 104, the detecting section 106, and the output control sections 108 may be constituted by a dedicated (or, general-purpose) circuit (for example, a processor etc. separated from the MPU 170) capable of realizing the process of each of the imaging control section 104, the detecting section 106, and the output control sections 108.

The ROM 172 memorizes programs used by the MPU 170 and data for control, such as arithmetic parameters. The RAM 174, for example, memorizes temporarily the programs etc. executed by the MPU 170.

The recording medium 176 functions as a memory section (not shown), and memorizes, for example, various data such as data related to the control method according to the present embodiments, such as a table (or data base) in which the movement speed and the imaging delay time are associated with each other, and various applications. Here, as the recording medium 176, for example, magnetic recording media, such as a hard disk, and nonvolatile memories, such as a flash memory are cited. Moreover, the recording medium 176 may be detachable from the control device 100.

The input/output interface 178 connects, for example, the operation input device 180 and the display device 182. The operation input device 180 functions as the operating section (not shown), and the display device 182 functions as the display section (not shown). Here as the input/output interface 178, for example, a USB (Universal Serial Bus) terminal, a DVI (Digital Visual Interface) terminal, an HDMI (High-Definition Multimedia Interface) (registered trademark) terminal, various processing circuits, etc. are cited.

The operation input device 180 is disposed, for example, on the control device 100, and is connected with the input/output interface 178 in the inside of the control device 100. As the operation input device 180, for example, a button, a rotary type selector, such as, a direction key and a jog dial, and a combination of them are cited.

The display device 182 is disposed, for example, on the control device 100, and is connected with the input/output interface 178 in the inside of the control device 100. As the display device 182, for example, a liquid crystal display (Liquid Crystal Display), an organic EL display (Organic Electro-Luminescence Display, or, also called an OLED display (Organic Light Emitting Diode Display) and so one are cited.

In this connection, it is needless to say that the input/output interface 178 can be connected with outside devices, such as an external operation input device (for example, a keyboard, a mouse, etc.) and an external display device of the control device 100. Moreover, the display device 182 may be, for example, a device capable of performing display and allowing a user to operate, such as a touch panel.

The communication interface 184 is a communicating means equipped in the control device 100, and functions as a communication section (not shown) that performs communication wirelessly or by wire with an external device, such as an external imaging device and an external recording medium and an external apparatus, such as a server, via a network (or directly). Here, as the communication interface 184, for example, a communications antenna and an RF (Radio Frequency) circuit (wireless communication), an IEEE802.15.1 port and a transceiver circuit (wireless communication), an IEEE802.11 port and a transceiver circuit (wireless communication), a LAN (Local Area Network) terminal and a transceiver circuit (cable communication), and the like are cited.

The imaging device 186 functions as an imaging section (not shown) that generates a captured image (moving image or still image) by imaging.

As the imaging device 186, for example, the imaging device 150 (including a constitution related to a modified example) having been described with reference to FIG. 7 is cited.

The control device 100, for example, performs processes related to the control method according to the present embodiment by the constitution shown in FIG. 8.

In this connection, the hardware constitution of the control device 100 according to the present embodiment is not limited to the constitution shown in FIG. 7 and FIG. 8.

For example, in the case where the control device 100 controls an external imaging device and performs the processes on the basis of a captured image having been imaged by the external imaging device, the control device 100 can take a constitution not equipped with the imaging device 186 shown in FIG. 8.

Moreover, the control device 100 can take a constitution not equipped with, for example, one or two or more of the recording medium 176, the operation input device 180, the display devices 182, and the communication interface 184 that are shown in FIG. 8.

Moreover, for example, the constitution (or a constitution related to a modified example) shown in FIG. 8 may be realized by one or two or more ICs (Integrated Circuit).

Again, with reference to FIG. 6, one example of the constitution of the control device 100 is described.

[1] Imaging Section 102

The imaging section 102 includes an imaging device and generates a captured image by imaging. As the imaging device included in the imaging section 102, for example, the imaging device 150 (including also a constitution related to a modified example) having been described with reference to FIG. 7, is cited.

[2] Imaging Control Section 104

The imaging control section 104 controls the imaging in the imaging device. FIG. 6 shows an example where the imaging device of a target controlled by the imaging control section 104 is an imaging device included in the imaging section 102. In this connection, the imaging device of a target controlled by the imaging control section 104 may be an external imaging device of the control device 100.

The imaging control section 104 makes the imaging device perform the imaging of the detection region ROI1, or the imaging of the acquisition region ROI2. In the case where, in the detecting section 106, a photographic subject has been detected on the basis of a captured image (the first captured image) in which the detection region ROI1 has been imaged, the imaging control section 104 makes it perform the imaging of the acquisition region ROI2.

In more concrete terms, for example, the imaging control section 104 makes it perform the imaging of the detection region ROI1 for each frame. Then, in the case where a photographic subject has been detected in one frame in which the imaging of the detection region ROI1 is performed, the imaging control section 104 makes it perform the imaging of the acquisition region ROI2 in the next frame.

In the case of citing a concrete example, for example, as having shown with reference to the first setting example of the detection region and the acquisition region shown in the above-described (A) through the fourth setting example of the detection region and the acquisition region shown in the above-described (D), the imaging control section 104 makes it perform the imaging of the detection region ROI1 and the imaging of the acquisition region ROI2.

[3] Detecting Section 106

The detecting section 106 detects a photographic subject on the basis of a captured image (the first captured image) in which the detection region ROI1 has been imaged. The detecting section 106, for example, detects a photographic subject by performing the detecting process related to the first example shown in the above-described (a), or the detecting process related to the second example shown in the above-described (b).

[4] Output Control Section 108

The output control section 108 controls the output of a captured image imaged by the imaging device of a target to be controlled, such as the imaging device that constitutes the imaging section 102.

As the control of the output of a captured image in the output control section 108, for example, one or both of the control of transmission of image data showing a captured image to an external device and the control of recording of image data showing a captured image into recording media, such as a memory section (not shown), is or are cited.

In the case of making it transmit image data showing a captured image to an external device, the output control section 108, for example, sends signals (output signals shown in FIG. 6) including the image data and transmission instruction to a communication section (mentioned later) or an external communication device connected to the control device 100.

moreover, in the case of making it record the image data showing a captured image in a recording medium, the output control section 108, for example, sends signals (output signals shown in FIG. 6) including the image data and recording instruction to one or both of the memory section (mentioned later) and an external recording medium connected to the control device 100.

Moreover, in the case of making it record the image data showing a captured image in a recording medium, the output control section 108, for example, sends signals (output signals shown in FIG. 6) including the image data, a transmission instruction, and a recording instruction to a communication section (mentioned later), and makes it transmit the signals including the image data and the recording instruction to an external device. By transmitting signals including image data showing a captured image, a transmission instruction, and a recording instruction to the communication section (mentioned later) etc., the signals including the image data and the recording instruction are caused to be transmitted to the external device, whereby the recording of the image data into the recording medium equipped in the external device can be realized.

The output control section 108, for example, controls the output of a captured image (the second captured image) in which the acquisition region ROI2 has been imaged, on the basis of the detection result of a photographic subject in the detecting section 106. The output control section 108 makes it output the captured image in which the acquisition region ROI2 has been imaged, for example, when a signal showing that the photographic subject has been detected has been transmitted from the detecting section 106.

In addition, the output control section 108 may control the output of a captured image (the first captured image) in which the detection region ROI1 has been imaged, on the basis of the detection result of a photographic subject in the detecting section 106. For example, the output control section 108 makes it output the captured image in which the detection region ROI1 has been imaged, for example, when a signal showing that no photographic subject has been detected has been transmitted from the detecting section 106.

The control device 100, for example, performs processes related to the control method according to the present embodiment by the constitution shown in FIG. 6.

In this connection, the constitution of the control device according to the present embodiment is not limited to the constitution shown in FIG. 6.

For example, in the case where the control device according to the present embodiment controls the imaging in an external imaging device and acquires a captured image including a photographic subject on the basis of a captured image having been imaged by the external imaging device, the control device according to the present embodiment may not be equipped with the imaging section 102 shown in FIG. 6.

Moreover, for example, it is also possible for the control device according to the present embodiment to take a constitution not equipped with the output control section 108 shown in FIG. 6. Even with the constitution not equipped with the output control section 108 shown in FIG. 6, in the case where a photographic subject has been detected on the basis of a captured image (the first captured image) in which the detection region ROI1 has been imaged, the control device according to the present embodiment can make the imaging device perform the imaging of the acquisition region ROI2. Therefore, even with the constitution not equipped with the output control section 108 shown in FIG. 6, the control device according to the present embodiment can obtain a captured image including a photographic subject while reducing an amount of data.

[5] Application Example of Control Device According to Present Embodiment

Although, as the present embodiment, description has been given by citing the control device, the present embodiment is not limited to such a mode. The present embodiment can be applied to, for example, an imaging apparatus equipped with an imaging device used by being installed at a fixed point, such as an industrial camera used in a factory, a physical distribution system, etc., a camera used in ITS, and a security camera. Moreover, the present embodiment can be applied to various devices capable of performing processes related to the control method according to the present embodiment, such as computers, such as a PC (Personal Computer) and a server. Moreover, the present embodiment can be also applied to, for example, a processing IC capable of being incorporated in the above-described imaging apparatus and devices.

Moreover, the control device according to the present embodiment may be applied to, for example, a system including a plurality of devices on the assumption of the connection (or communication between respective devices) with a network, such as cloud computing. That is, the control device according to the above-mentioned present embodiment, for example, can also be realized as a control system that performs processes related to the control method according to the present embodiment by a plurality of devices. As one example of the control system that performs processes related to the control method according to the present embodiment by a plurality of devices, cited is, for example, a system in which "a process related to the control of imaging in an imaging device" and "a detecting process of a photographic subject on the basis of a captured image in which the detection region ROI1 has been imaged" are performed in cooperation in a plurality of devices that constitute the control system.

Furthermore, it is possible for the control device according to the present embodiment to be applied to, for example, arbitrary movable objects, such as a car, an electric vehicle, a hybrid electric vehicle, a motorcycle, a bicycle, a personal mobility, an airplane, a drone, a marine vessel, and a robot.

Hereinafter, one example of a case where the technology according to the present embodiment is applied to a movable object is described.

Figure 9:
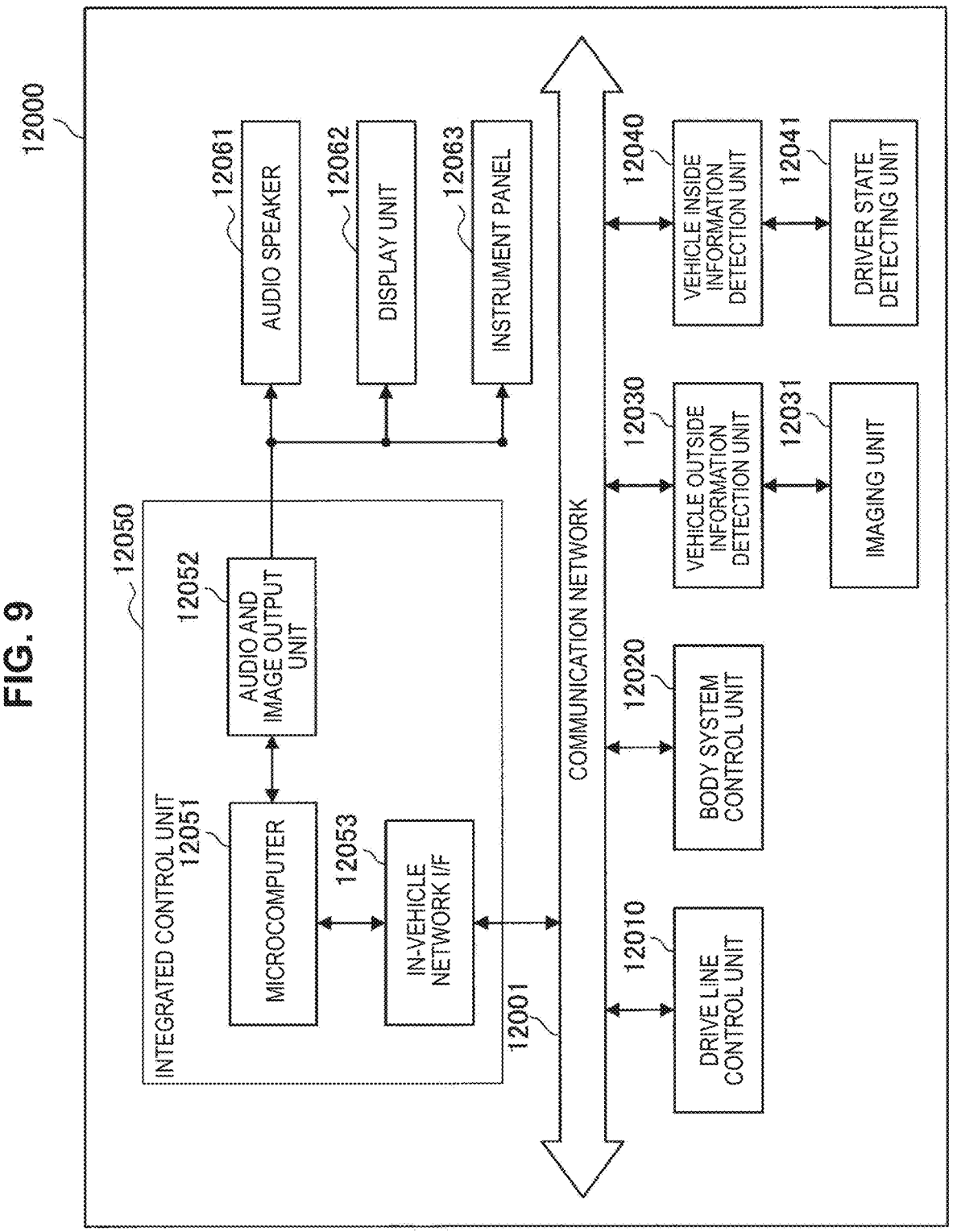
FIG. 9 is a block diagram illustrating a schematic configuration example of a vehicle control system which is an example of a mobile object control system to which a technology according to an embodiment of the present technology is applicable.

FIG. 9 is a block diagram illustrating a schematic configuration example of a vehicle control system which is an example of a mobile object control system to which a technology according to an embodiment of the present technology is applicable.

A vehicle control system 12000 includes a plurality of electronic control units connected via a communication network 12001. In the example illustrated in FIG. 9, the vehicle control system 12000 includes a drive line control unit 12010, a body system control unit 12020, a vehicle outside information detection unit 12030, a vehicle inside information detection unit 12040, and an integrated control unit 12050. In addition, as functional configurations of the integrated control unit 12050, a microcomputer 12051, an audio and image output unit 12052, an in-vehicle network interface (I/F) 12053.

The drive line control unit 12010 controls the operation of devices related to the drive line of the vehicle in accordance with a variety of programs. For example, the drive line control unit 12010 functions as a control device for a driving force generating device such as an internal combustion engine or a driving motor that generates the driving force of the vehicle, a driving force transferring mechanism that transfers the driving force to wheels, a steering mechanism that adjusts the steering angle of the vehicle, a braking device that generates the braking force of the vehicle, and the like.

The body system control unit 12020 controls the operations of a variety of devices attached to the vehicle body in accordance with a variety of programs. For example, the body system control unit 12020 functions as a control device for a keyless entry system, a smart key system, a power window device, or a variety of lights such as a headlight, a backup light, a brake light, a blinker, or a fog lamp. In this case, the body system control unit 12020 can receive radio waves transmitted from a portable device that serves instead of the key or signals of a variety of switches. The body system control unit 12020 receives these radio waves or signals, and controls the vehicle door lock device, the power window device, the lights, or the like.

The vehicle outside information detection unit 12030 detects information regarding the outside of a vehicle on which the vehicle control system 12000 is mounted. For example, an imaging unit 12031 is connected to the vehicle outside information detection unit 12030. The vehicle outside information detection unit 12030 causes the imaging unit 12031 to capture an image outside of the vehicle and receives the captured image. The vehicle outside information detection unit 12030 may perform an object detection process or a distance detection process for a person, a vehicle, an obstacle, a sign, letters on a road, or the like on the basis of the received image.

The imaging unit 12031 is a light sensor that receives light and outputs an electric signal in accordance with the amount of received light. The imaging unit 12031 can output the electric signal as an image or distance measurement information. In addition, the light received by the imaging unit 12031 may be the visible light or may be non-visible light such as infrared light.

The vehicle inside information detecting unit 12040 detects information regarding the inside of the vehicle. The vehicle inside information detecting unit 12040 is connected, for example, to a driver state detecting unit 12041 that detects the state of the driver. The driver state detecting unit 12041 may include, for example, a camera that images the driver. The vehicle inside information detecting unit 12040 may compute the degree of the driver's tiredness or the degree of the driver's concentration or determine whether the driver have a doze, on the basis of detection information input from the driver state detecting unit 12041.

For example, the microcomputer 12051 can calculate a control target value of the driving force generating device, the steering mechanism, or the braking device on the basis of information acquired by the vehicle outside information detecting unit 12030 or the vehicle inside information detecting unit 12040 on the inside and outside of the vehicle, and output a control instruction to the drive line control unit 12010. For example, the microcomputer 12051 may perform cooperative control for the purpose of executing the functions of an advanced driver assistance system (ADAS) including vehicle collision avoidance or impact reduction, follow-up driving based on the inter-vehicle distance, constant vehicle speed driving, vehicle collision warning, vehicle lane departure warning, or the like.

Further, the microcomputer 12051 can control the driving force generating device, the steering mechanism, the braking device, or the like on the basis of information acquired by the vehicle outside information detecting unit 12030 or the vehicle inside information detecting unit 12040 on the areas around the vehicle, thereby performing cooperative control for the purpose of automatic driving or the like that allows the vehicle to autonomously travel irrespective of any operation of a driver.

In addition, the microcomputer 12051 can output a control instruction to the body system control unit 12020 on the basis of the information regarding the outside of the vehicle acquired by the vehicle outside information detection unit 12030. For example, the microcomputer 12051 can control a head lamp in accordance with the position of a preceding vehicle or an oncoming vehicle detected by the vehicle outside information detection unit 12030 and can perform cooperative control for the purpose of anti-glaring such as switching a high beam to a low beam.

The audio and image output unit 12052 transmits an output signal of at least one of a sound and an image to an output device capable of visually or aurally notifying a passenger of the vehicle or the outside of the vehicle of information. In the example of FIG. 9, an audio speaker 12061, a display unit 12062, and an instrument panel 12063 are exemplified as the output device. For example, the display unit 12062 may include at least one of an onboard display or a head-up display.

Figure 10:
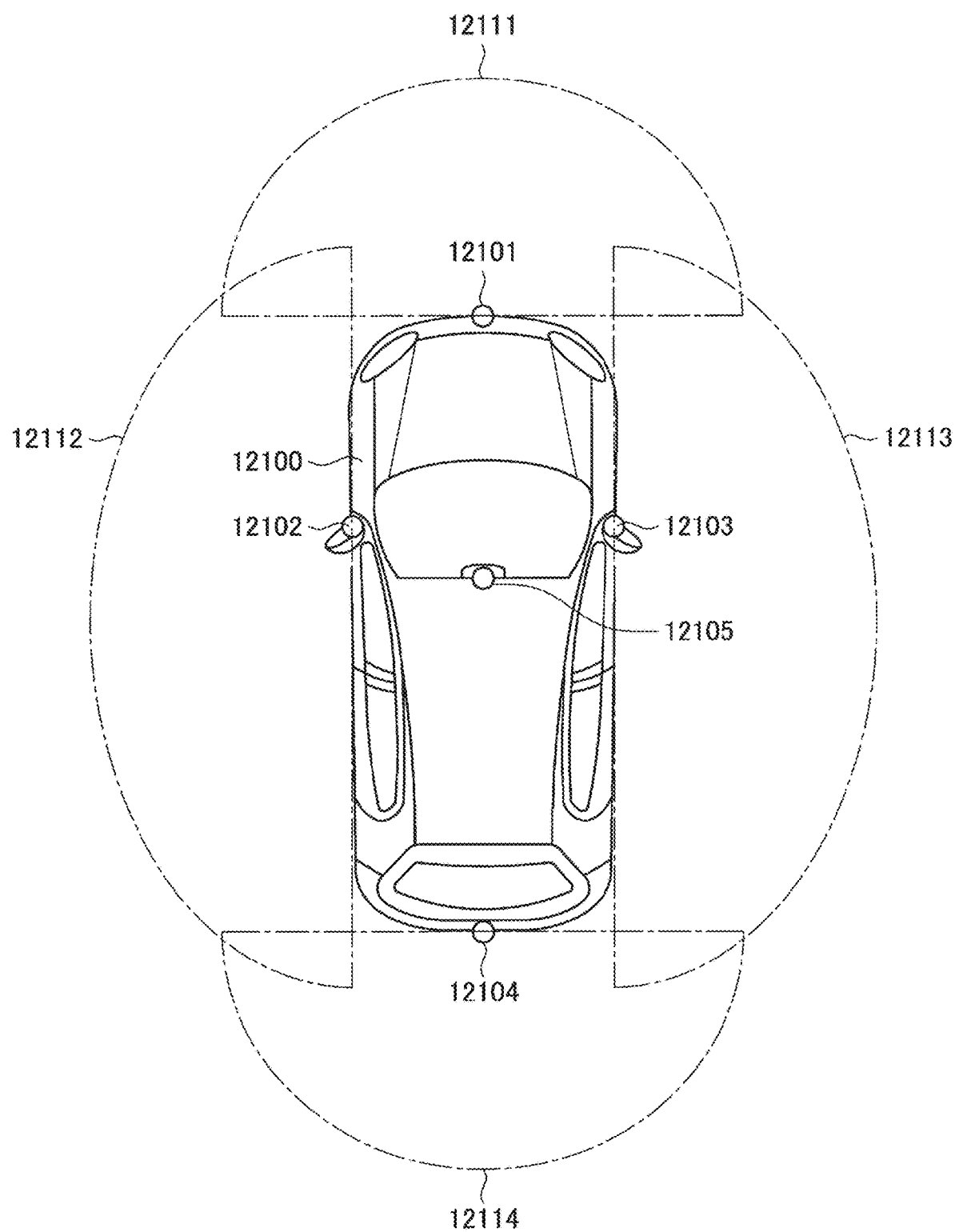
FIG. 10 is a diagram illustrating an example of an installation position of an imaging unit 12031.

FIG. 10 is a diagram illustrating an example of an installation position of the imaging unit 12031.

In FIG. 10, the vehicle 12100 includes imaging units 12101, 12102, 12103, 12104, and 12105 as the imaging unit 12031.

Imaging units 12101, 12102, 12103, 12104, and 12105 are positioned, for example, at the front nose, a side mirror, the rear bumper, the back door, and the upper part of the windshield in the vehicle compartment of a vehicle 12100. The imaging unit 12101 attached to the front nose and the imaging unit 12105 attached to the upper part of the windshield in the vehicle compartment chiefly acquire images of the area ahead of the vehicle 12100. The imaging units 12102 and 12103 attached to the side mirrors chiefly acquire images of the areas on the sides of the vehicle 12100. The imaging unit 12104 attached to the rear bumper or the back door chiefly acquires images of the area behind the vehicle 12100. A front image acquired by the imaging units 12101 and 12105 is used chiefly to detect a preceding vehicle, a pedestrian, an obstacle, a traffic light, a traffic sign, a lane, or the like.

Additionally, FIG. 10 illustrates an example of the imaging ranges of the imaging units 12101 to 12104. An imaging range 12111 represents the imaging range of the imaging unit 12101 attached to the front nose. Imaging ranges 12112 and 12113 respectively represent the imaging ranges of the imaging units 12102 and 12103 attached to the side mirrors. An imaging range 12114 represents the imaging range of the imaging unit 12104 attached to the rear bumper or the back door. For example, overlaying image data captured by the imaging units 12101 to 12104 offers an overhead image that looks down on the vehicle 12100.

At least one of the imaging units 12101 to 12104 may have a function of acquiring distance information. For example, at least one of the imaging units 12101 to 12104 may be a stereo camera including a plurality of image sensors or may be an image sensor that includes pixels for phase difference detection.

For example, the microcomputer 12051 can extract a 3-dimensional object traveling at a predetermined speed (for example, 0 or more km/h) in substantially the same direction as the vehicle 12100 as a preceding vehicle by particularly using a closest 3-dimensional object on a travel road of the vehicle 12100 by obtaining a distance to each 3-dimensional object within the imaging ranges 12111 to 12114 and a temporal change in the distance (a relative speed to the vehicle 12100) on the basis of distance information obtained from the imaging units 12101 to 12104. Further, the microcomputer 12051 can set an inter-vehicle distance to be ensured in advance before a preceding vehicle and perform automatic brake control (also including follow-up stop control) or automatic acceleration control (also including follow-up oscillation control). In this way, it is possible to perform cooperative control for the purpose of automatic driving or the like that allows the vehicle to autonomously travel irrespective of any operation of a driver.

For example, the microcomputer 12051 can classify and extract 3-dimensional object data regarding 3-dimensional objects as other 3-dimensional objects such as motorcycles, normal vehicles, large vehicles, pedestrians, and electric poles on the basis of the distance information obtained from the imaging units 12101 to 12104 and can use the other 3-dimensional objects to automatically avoid obstacles. For example, the microcomputer 12051 identifies obstacles around the vehicle 12100 as obstacles which can be viewed by a driver of the vehicle 12100 and obstacles which are difficult to view. Then, the microcomputer 12051 can determine a collision risk indicating a danger of collision with each obstacle and output a warning to the driver via the audio speaker 12061 or the display unit 12062 in a situation in which there is a collision possibility since the collision risk is set to be equal to or greater than a set value or can perform driving assistance for collision avoidance by performing forced deceleration or avoidance steering iv via the drive line control unit 12010.

At least one of the imaging units 12101 to 12104 may be an infrared camera that detects infrared light. For example, the microcomputer 12051 can recognize a pedestrian by determining whether or not there is the pedestrian in captured images of the imaging units 12101 to 12104. The pedestrian can be recognized, for example, in a procedure in which feature points are extracted in the captured images of the imaging units 12101 to 12104 serving as infrared cameras and a procedure in which a series of feature points indicating a contour of an object are subjected to a pattern matching process to determine whether or not there is the pedestrian. The microcomputer 12051 determines that there is the pedestrian in the captured images of the imaging units 12101 to 12104. When the pedestrian is recognized, the audio and image output unit 12052 controls the display unit 12062 such that a rectangular contour line for emphasis is superimposed to be displayed on the recognized pedestrian. In addition, the audio and image output unit 12052 controls the display unit 12062 such that an icon or the like indicating the pedestrian is displayed at a desired position.

In the above, the one example of the vehicle control system in the case where the technology according to the present embodiment is applied to movable objects has been described. The technology according to the present embodiment may be applied to, for example, the microcomputer 12051 in the above-described vehicle control system. In this connection, constituent elements applied with the technology according to the present embodiment in the above-described vehicle control system are not limited to the microcomputer 12051, and can be applied to arbitrary constituent elements that can perform processes related to the control method according to the present embodiment.

(Program According to Present Embodiment)

A program for making a computer function as the control device according to the present embodiment (for example, a program capable of executing processes related to the control method according to the present embodiment, such as "a program for making a computer realize a function that controls imaging in an imaging device and a function that detects a photographic subject on the basis of a captured image in which the detection region ROI1 has been imaged" and "a program for making a computer realize a function that controls imaging in an imaging device, a function that detects a photographic subject on the basis of a captured image in which the detection region ROI1 has been imaged, and a function that controls output of a captured image imaged by the imaging device") is executed by a processor and the like in the computer, whereby it is possible to obtain a captured image including a photographic subject while reducing an amount of data.

Moreover, in the case where the program for making a computer function as the control device according to the present embodiment is executed by a processor and the like in the computer, it is possible to attain the above-mentioned effects exerted by the processes related to the control method according to the present embodiment.

Note that, in this description and the drawings, structural elements that have substantially the same function and structure are sometimes distinguished from each other using different alphabets after the same reference sign. However, when there is no need in particular to distinguish structural elements that have substantially the same function and structure, the same reference sign alone is attached.

For example, although, in the above description, it has been shown to provide a program (computer program) for making a computer function as the control device according to the present embodiment, it is possible in the present embodiment to further provide a recording medium in which the above-described program is memorized.

The above-mentioned constitution shows one example of the present embodiment, and, naturally belongs to the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A control device, including:

an imaging control section that controls imaging in an imaging device; and a detecting section that detects a photographic subject on a basis of a first captured image in which a detection region set at a part within a field angle of the imaging device has been imaged;

in which the imaging control section makes the imaging device perform imaging of the detection region or imaging of an acquisition region set within the field angle of the imaging device, and in a case where the photographic subject has been detected on a basis of the first captured image, the imaging control section makes the imaging device perform imaging of the acquisition region.

(2)

The control device according to (1), in which the imaging control section makes the imaging device perform imaging of the detection region for each frame, and in a case where the photographic subject has been detected in one frame in which imaging of the detection region is performed, the imaging control section makes the imaging device perform imaging of the acquisition region in a next frame.

(3)

The control device according to (1) or (2), in which the detecting section detects the photographic subject on a basis of a comparison result between a pixel value of the first captured image and one or both of a set first threshold and a set second threshold smaller than the first threshold.

(4)

The control device according to (3), in which the detecting section counts a number of pixels in which a pixel value of the first captured image is larger than the first threshold or a number of pixels in which a pixel value of the first captured image is the first threshold or more, and detects the photographic subject by determining whether the photographic subject has been detected, on a basis of a comparison result between the counted number of pixels and a set third threshold.

(5)

The control device according to (4), in which in a case where the counted number of pixels is larger than the third threshold, or in a case where the number of pixels is the third threshold or more, the detecting section determines that the photographic subject has been detected.

(6)

The control device according to any one of (3) to (5), in which the detecting section counts a number of pixels in which a pixel value of the first captured image is smaller than the second threshold or a number of pixels in which a pixel value of the first captured image is the second threshold or more, and detects the photographic subject by determining whether the photographic subject has been detected, on a basis of a comparison result between the counted number of pixels and a set fourth threshold.

(7)

The control device according to (6), in which in a case where the counted number of pixels is larger than the fourth threshold, or in a case where the number of pixels is the fourth threshold or more, the detecting section determines that the photographic subject has been detected.

(8)

The control device according to (2), in which the detecting section detects the photographic subject on a basis of a comparison result between a set fifth threshold and a determination value based on a pixel value of the first captured image in a present frame and a pixel value of the first captured image in a previous frame.

(9)

The control device according to any one of (1) to (8), in which in a case where a plurality of the detection regions are set independently, the detecting section detects the photographic subject for each of the plurality of the detection regions on a basis of the first captured image corresponding to each of the plurality of the detection regions.

(10) The control device according to (9), in which the acquisition region is set for each of the plurality of the detection regions, and the imaging control section makes the imaging device perform imaging of the acquisition region corresponding to the detection region in which the photographic subject has been detected.

(11) The control device according to any one of (1) to (10), in which within a field angle of the imaging device, as the detection region, a first detection region and a second detection region corresponding to the first detection region are set, and the detecting section detects the photographic subject on a basis of each of the first captured image corresponding to the first detection region and the first captured image corresponding to the second detection region, and further detects a movement speed of the photographic subject on a basis of a detection result.

(12) The control device according to (11), in which the imaging control section makes the imaging device perform imaging of the acquisition region at a timing based on the detected movement speed.

(13) The control device according to any one of (1) to (10), in which the imaging control section makes the imaging device perform imaging of the acquisition region at a set predetermined timing.

(14) The control device according to any one of (1) to (13), in which the detection region is a part of a region within a field angle that makes it possible to image at least a part of the photographic subject.

(15) The control device according to any one of (1) to (14), in which the acquisition region is a region of a whole field angle of the imaging device or a part of a region within a field angle of the imaging device that makes it possible to image the whole photographic subject.

(16) The control device according to any one of (1) to (15), further including:

an output control section that controls output of a captured image having been imaged by the imaging device on a basis of a detection result of the photographic subject.

(17) The control device according to (16), in which in a case where the photographic subject has been detected, the output control section outputs a second captured image in which the acquisition region has been imaged.

(18) The control device according to any one of (1) to (17), further including:

an imaging section including the imaging device.

(19) A control method that is executed by a control device, the control method including:

a step of controlling imaging in an imaging device; and
a step of detecting a photographic subject on a basis of a first captured image in which a detection region set at a part within a field angle of the imaging device has been imaged,
in which, in the controlling step, the imaging device is caused to perform imaging of the detection region or imaging of an acquisition region set within the field angle of the imaging device, and in a case where the photographic subject has been detected on a basis of the first captured image, the imaging device is caused to perform imaging of the acquisition region.

(20) A program for causing a computer to achieve:

a function of controlling imaging in an imaging device; and
a function of detecting a photographic subject on a basis of a first captured image in which a detection region set at a part within a field angle of the imaging device has been imaged,
in which the function of controlling imaging makes the imaging device perform imaging of the detection region or imaging of an acquisition region set within the field angle of the imaging device, and in a case where the photographic subject has been detected on a basis of the first captured image, the function of controlling imaging makes the imaging device perform imaging of the acquisition region.

REFERENCE SIGNS LIST

100 control device
102 imaging section
104 imaging control section
106 detecting section
108 output control section

The invention claimed is:

1. A control device, comprising:
an imaging controller configured to control imaging in an imaging device; and
a detector configured to detect a photographic subject on a basis of a first captured image in which a detection region set at a part within a field angle of the imaging device has been imaged, wherein
the imaging controller makes the imaging device perform imaging of the detection region or imaging of an acquisition region set within the field angle of the imaging device,
in a case where the photographic subject has been detected on a basis of the first captured image, the imaging controller makes the imaging device perform imaging of the acquisition region, and
in a case where a plurality of the detection regions are set independently, the detector detects the photographic subject for each of the plurality of the detection regions on a basis of the first captured image corresponding to each of the plurality of the detection regions.

2. The control device according to claim 1, wherein
the imaging controller makes the imaging device perform imaging of the detection region for each frame, and
in a case where the photographic subject has been detected in one frame in which imaging of the detection region is performed, the imaging controller makes the imaging device perform imaging of the acquisition region in a next frame.

3. The control device according to claim 2, wherein the detector detects the photographic subject on a basis of a comparison result between a set fifth threshold and a determination value based on a pixel value of the first captured image in a present frame and a pixel value of the first captured image in a previous frame.

4. The control device according to claim 1, wherein the detector detects the photographic subject on a basis of a comparison result between a pixel value of the first captured image and one or both of a set first threshold and a set second threshold smaller than the first threshold.

5. The control device according to claim 4, wherein the detector
counts a number of pixels in which a pixel value of the first captured image is larger than the first threshold or a number of pixels in which a pixel value of the first captured image is the first threshold or more, and
detects the photographic subject by determining whether the photographic subject has been detected, on a basis of a comparison result between the counted number of pixels and a set third threshold.

6. The control device according to claim 5, wherein, in a case where the counted number of pixels is larger than the third threshold, or in a case where the number of pixels is the third threshold or more, the detector determines that the photographic subject has been detected.

7. The control device according to claim 4, wherein the detector
counts a number of pixels in which a pixel value of the first captured image is smaller than the second threshold or a number of pixels in which a pixel value of the first captured image is the second threshold or more, and
detects the photographic subject by determining whether the photographic subject has been detected, on a basis of a comparison result between the counted number of pixels and a set fourth threshold.

8. The control device according to claim 7, wherein, in a case where the counted number of pixels is larger than the fourth threshold, or in a case where the number of pixels is the fourth threshold or more, the detector determines that the photographic subject has been detected.

9. The control device according to claim 1, wherein
the acquisition region is set for each of the plurality of the detection regions, and
the imaging controller makes the imaging device perform imaging of the acquisition region corresponding to the detection region in which the photographic subject has been detected.

10. The control device according to claim 1, wherein
within a field angle of the imaging device, as the detection region, a first detection region and a second detection region corresponding to the first detection region are set, and
the detector
detects the photographic subject on a basis of each of the first captured image corresponding to the first detection region and the first captured image corresponding to the second detection region, and
further detects a movement speed of the photographic subject on a basis of a detection result.

11. The control device according to claim 10, wherein the imaging controller makes the imaging device perform imaging of the acquisition region at a timing based on the detected movement speed.

12. The control device according to claim 1, wherein the imaging controller makes the imaging device perform imaging of the acquisition region at a set predetermined timing.

13. The control device according to claim 1, wherein the detection region is a part of a region within a field angle that makes it possible to image at least a part of the photographic subject.

14. The control device according to claim 1, wherein the acquisition region is a region of a whole field angle of the imaging device or a part of a region within a field angle of the imaging device that makes it possible to image the whole photographic subject.

15. The control device according to claim 1, further comprising:
an output controller that controls output of a captured image having been imaged by the imaging device on a basis of a detection result of the photographic subject.

16. The control device according to claim 15, wherein, in a case where the photographic subject has been detected, the output controller outputs a second captured image in which the acquisition region has been imaged.

17. The control device according to claim 1, further comprising:
an imaging section including the imaging device.

18. A control method that is executed by a control device, the control method comprising:
controlling imaging in an imaging device; and
detecting a photographic subject on a basis of a first captured image in which a detection region set at a part within a field angle of the imaging device has been imaged,
wherein the controlling includes:
controlling the imaging device to perform imaging of the detection region or imaging of an acquisition region set within the field angle of the imaging device, and
in a case where the photographic subject has been detected on a basis of the first captured image, controlling the imaging device to perform imaging of the acquisition region, and
wherein, in a case where a plurality of the detection regions are set independently, the detecting detects the photographic subject for each of the plurality of the detection regions on a basis of the first captured image corresponding to each of the plurality of the detection regions.

19. A non-transitory computer-readable storage medium storing a program that when executed by a computer causes the computer to perform a control method, wherein the control method comprises:
controlling imaging in an imaging device; and
detecting a photographic subject on a basis of a first captured image in which a detection region set at a part within a field angle of the imaging device has been imaged,
wherein the controlling of the imaging includes:
controlling the imaging device to perform imaging of the detection region or imaging of an acquisition region set within the field angle of the imaging device, and
in a case where the photographic subject has been detected on a basis of the first captured image, controlling the imaging device to perform imaging of the acquisition region, and
wherein, in a case where a plurality of the detection regions are set independently, the detecting detects the photographic subject for each of the plurality of the detection regions on a basis of the first captured image corresponding to each of the plurality of the detection regions.

* * * * *